United States Patent
Nagai

(10) Patent No.: US 7,574,477 B2
(45) Date of Patent: Aug. 11, 2009

(54) ELECTRONIC MAIL DISTRIBUTING APPARATUS WITH EMAIL ADDRESS REGISTRATION OR AUTHENTICATION FEATURES, ELECTRONIC MAIL DISTRIBUTING METHOD THEREFOR, AND STORAGE MEDIUM STORING A PROGRAM FOR THE APPARATUS

(75) Inventor: Hiroyuki Nagai, Kanagawa (JP)

(73) Assignee: Canon Kabushiki Kaisha (JP)

( * ) Notice: Subject to any disclaimer, the term of this patent is extended or adjusted under 35 U.S.C. 154(b) by 989 days.

(21) Appl. No.: 10/739,909

(22) Filed: Dec. 18, 2003

(65) Prior Publication Data

US 2004/0193690 A1 Sep. 30, 2004

(30) Foreign Application Priority Data

Dec. 19, 2002 (JP) ............................. 2002-368853

(51) Int. Cl.
*G06F 15/16* (2006.01)
*G06F 15/173* (2006.01)
*G06F 15/177* (2006.01)

(52) U.S. Cl. ...................................... 709/206; 423/700
(58) Field of Classification Search ......... 709/200–206, 709/217–224; 423/700
See application file for complete search history.

(56) References Cited

U.S. PATENT DOCUMENTS

2002/0103932 A1* 8/2002 Bilbrey et al. ............... 709/245
2003/0233413 A1* 12/2003 Becker ........................ 709/206
2004/0054733 A1* 3/2004 Weeks ......................... 709/206

FOREIGN PATENT DOCUMENTS

| JP | 11167533 A | 6/1999 |
|---|---|---|
| JP | 2000010800 A | 1/2000 |
| JP | 2002064531 A | 2/2002 |

OTHER PUBLICATIONS

Schwartz, Alan; Mailing Lists System Management; Sep. 7, 1998; pp. 235-236; Tokyo Japan. Partial translation provided.

* cited by examiner

*Primary Examiner*—Haresh N Patel
(74) *Attorney, Agent, or Firm*—Rossi, Kimms & McDowell LLP

(57) ABSTRACT

There is provided an electronic mail distributing apparatus which can prevent attacks by repeated subscription. E-mail addresses as destinations of e-mails to be distributed are stored in a first database, and e-mail addresses to which e-mail distribution is rejected are stored in a second database. If the received e-mail address is not stored in the second database, it is registered in the first database, but if not, authentication information is requested from an external apparatus to carry out an authenticating process on the received e-mail address. The e-mail address is registered in the first database when the authentication is successful, whereas the registration of the e-mail address in the first database is rejected when the authentication is unsuccessful.

15 Claims, 17 Drawing Sheets

FIG. 4

SET UP NOT TO DISTRIBUTE
E-MAILS TO
person@sample.co.jp

```
To: person@sample.co.jp
From: notice@notice.co.jp
Subject: Message For Confirmation
------------------------------------------------
 THANK YOU FOR
USING UPDATE NOTIFICATION SERVICE.
 IF YOU DON'T THINK
YOU HAVE SUBSCRIBED TO THIS SERVICE OR
YOU WOULD LIKE TO UNSUBSCRIBE,
PLEASE ACCESS THE FOLLOWING URL:

http://www.notice.co.jp/unsubscribe?key=ghY15f63&a
ddress=person@sample.co.jp

WE USE AUTHENTICATION SYSTEM TO PREVENT
THE SYSTEM FROM BEING MISUSED.
 PLEASE USE THE FOLLOWING AUTHENTICATION
KEY FROM NEXT TIME WHEN REQUIRED.

AUTHENTICATION KEY: hljysb12fd5
```

1401 — points to the unsubscribe URL section
1402 — points to the authentication key section

FIG. 18

```
To: person@sample.co.jp
From: notice@notice.co.jp
Subject: Subscription Confirmation
------------------------------------------------------------
 THANK YOU FOR
USING OUR UPDATE NOTIFICATION SERVICE.
 YOUR REJECTION OF DISTRIBUTION
HAS BEEN ACCEPTED.
 FUTURE SUBSCRIPTION TO THIS SERVICE
WITH ADDRESS person@sample.co.jp WILL NOT BE
ACCEPTED UNLESS AUTHENTICATION KEY
IS ENTERED.
 THIS PREVENTS UNAUTHORIZED SUBSCRIPTION.
 IF YOU DON'T THINK
YOU HAVE SUBSCRIBED TO THIS SERVICE OR
YOU WOULD LIKE TO UNSUBSCRIBE,
PLEASE ACCESS THE FOLLOWING URL.
 YOU CAN SUBSCRIBE IN FUTURE
USING AUTHENTICATION KEY WRITTEN BELOW.
 http://www.notice.co.jp/subscribe AUTHENTICATION KEY: hljysb12fd5
```

To: notice@notice.com
From: person@sample.co.jp
Subject:subscribe
- - - - - - - - - - - - - - - - - - - - - - - - - - -
subscribe

To: notice@notice.com
From: person@sample.co.jp
Subject:subscribe
- - - - - - - - - - - - - - - - - - - - - - - - - - -
subscribe
Pass=hLJysb12fd5

2002

ELECTRONIC MAIL DISTRIBUTING APPARATUS WITH EMAIL ADDRESS REGISTRATION OR AUTHENTICATION FEATURES, ELECTRONIC MAIL DISTRIBUTING METHOD THEREFOR, AND STORAGE MEDIUM STORING A PROGRAM FOR THE APPARATUS

BACKGROUND OF THE INVENTION

1. Field of the Invention

The present invention relates to an electronic mail distributing apparatus and an electronic mail distributing method which distribute e-mails to registered e-mail addresses, a program for controlling the method, and a storage medium storing the program.

2. Description of the Related Art

To provide and share information on the Internet, electronic mails or e-mails are widely used not only on a one-to-one basis but on a one-to-many basis and a many-to-many basis. For example, company's advertising mails are distributed on a one-to-many basis, and mailing lists are used on a many-to-many basis. In either case, an electronic mail distributing apparatus is used to distribute e-mails to many people.

The electronic mail distributing apparatus is capable of receiving e-mail addresses from persons who wish to have e-mails distributed and registering the received e-mail addresses as destinations of e-mails to be distributed, deleting e-mail addresses registered as destinations of e-mails to be distributed, and receiving information from an information provider and distributing e-mails containing the received information to registered e-mail addresses.

The electronic mail distributing apparatus can be used by unspecified persons. In the case where an e-mail subscription is made on a Web, the user can subscribe to e-mails only by causing a user terminal to display a HTML page prepared in advance for e-mail address registration, enter an e-mail address in the displayed HTML page, and send the same to the electronic mail distributing apparatus. In the case where an e-mail subscription is made by sending an e-mail to the electronic mail distributing apparatus, the user sends an e-mail with a word "subscribe" in the body thereof to the electronic mail distributing apparatus so that his/her e-mail address can be registered as a destination of e-mails to be distributed.

However, such a simple system of making an e-mail subscription raises a problem in terms of the security because an unauthorized third party other than a person who owns an e-mail address can make an e-mail subscription. If an unauthorized third party other than a person who owns an e-mail address makes an e-mail subscription, e-mails are distributed to him/her, and hence he/she receives undesired e-mails. Namely, the electronic mail distributing apparatus can be used to attack user terminals of many unspecified persons.

To counter such attacks, an electronic mail distributing apparatus has been proposed which sends a subscription confirmation e-mail to a user terminal in response to an e-mail subscription having been made. The subscription confirmation e-mail is sent to an e-mail address which has been registered. If the recipient has no memory of having subscribed, he/she can unsubscribe using the subscription confirmation e-mail. Also, an electronic mail distributing apparatus has been proposed which does not send subscription confirmation e-mails, but distributes e-mails including instructions on how to unsubscribe.

Further, a variety of techniques have been proposed to counter attacks using e-mails (for example, Japanese Laid-Open Patent Publication (Kokai) No. H11-167533, Japanese Laid-Open Patent Publication (Kokai) No. 2000-10800, and Japanese Laid-Open Patent Publication (Kokai) No. 2002-64531). Specifically, an electronic mail firewall is installed on a recipient's terminal according to Japanese Laid-Open Patent Publication (Kokai) No. H11-167533, a device which rejects reception of predetermined mails is installed between a mail server and an electronic mail distributing apparatus according to Japanese Laid-Open Patent Publication (Kokai) No. 2000-10800, or a mail server is provided with a mail rejecting function according to Japanese Laid-Open Patent Publication (Kokai) No. 2002-64531, so that predetermined e-mails can be rejected according to description patterns thereof. Namely, e-mails to be rejected are selected by referring to titles thereof and sender's e-mail addresses.

However, according to the method in which a subscription confirmation e-mail is sent and the method in which a description of instructions on how to unsubscribe is added to e-mails to be distributed, the user cannot counter attacks until he/she receives the first e-mail (i.e. a subscription confirmation e-mail or an e-mail which is distributed for the first time). Further, after unsubscribing, the status before subscribing is restored, allowing attacks by repeated subscription by an unauthorized third party. Namely, subscription confirmation e-mails themselves can be used for attacks.

Further, although in Japanese Laid-Open Patent Publication (Kokai) No. H11-167533, Japanese Laid-Open Patent Publication (Kokai) No. 2000-10800, and Japanese Laid-Open Patent Publication (Kokai) No. 2002-64531 that counter e-mail attacks, repeated attacks using e-mails as above can be prevented, it is difficult to find out and register description patterns of e-mails to be rejected. The titles of e-mails and the descriptions of sender's e-mail addresses do not necessarily include information which specifies an electronic mail distributing apparatus. A plurality of mail servers may be managed on the basis of the same sender's e-mail address, and e-mails to be distributed are not necessarily titled in specific patterns which are uniquely determined for each mail server. Therefore, determining whether e-mails are to be rejected or not according to their description patterns may cause necessary e-mails to be rejected or cause unnecessary e-mails to be not rejected.

SUMMARY OF THE INVENTION

It is an object of the present invention to provide an electronic mail distributing apparatus and an electronic mail distributing method, which can easily and positively prevent attacks by repeated subscription, a program for controlling the electronic mail distributing method, and a storage medium storing the program.

To attain the above object, in a first aspect of the present invention, there is provided an electronic mail distributing apparatus connected to at least one external apparatus via a network, comprising a first storage section that stores e-mail addresses as destinations of e-mails to be distributed, a second storage section that stores e-mail addresses to which e-mail distribution is rejected, a distributing section that distributes desired e-mails addressed to the e-mail addresses stored in the first storage section, a first receiving section that receives an e-mail address as a destination of e-mails to be distributed from at least one of the apparatus, a first determining section that determines whether the e-mail address received by the first receiving section is stored in the second storage section, a first registration control section that provides control to register the received e-mail address in the first storage section when the first determining section determines that the received e-mail address is not stored in the second storage section, a first authenticating section that requests authentication information from the external apparatus to carry out an authenticating process on the received e-mail address when the first determining section determines that the received e-mail address is stored in the second storage section, and a second registration control section provides control to register the received e-mail address in the first storage section when the first authenticating section has succeeded in authentication of the received e-mail address, and to reject registration of the received e-mail address in the first storage section when the first authenticating section has failed in authentication of the received e-mail address.

According to the first aspect of the present invention, when an e-mail address is registered for subscription, it is authenticated whether the e-mail address has been registered by a person who owns it, so that whether or not a request for the subscription has been made by a user who owns an e-mail address can be discriminated. As a result, even in the case where e-mail distribution rejection has been registered to prevent attacks, it is possible to safely subscribe by carrying out the authentication process. Registration of the received e-mail address is rejected when the authentication has resulted in failure. As a result, it is possible to easily and positively prevent attacks by repeated subscription.

Preferably, the electronic mail distributing apparatus further comprises a second receiving section that receives an e-mail address, to which e-mail distribution is to be rejected, from at least one of the apparatus, and a third registration control section that provides control to register the e-mail address received by the second receiving section, in the second storage section.

According to this arrangement, when an e-mail address to which e-mail distribution is rejected is registered, it is authenticated whether the e-mail distribution rejection has been registered by a person who owns it. As a result, it is possible to prevent attacks by repeated subscription.

Preferably, the electronic mail distributing apparatus further comprises a first confirmation e-mail sending section that sends a confirmation e-mail, containing authentication information for use in the authenticating process carried out by the first authenticating section, to the e-mail address registered in the second storage section by the third registration control section.

Preferably, the electronic mail distributing apparatus further comprises a second receiving section that receives an e-mail address, to which e-mail distribution is to be rejected, from at least one of the external apparatus, a second determining section that determines whether the e-mail address received by the second receiving section is stored in the first storage section, a fourth registration control section that provides control to register the received e-mail address in the second storage section when the second determining section determines that the received e-mail address is not stored in the first storage section, a second authenticating section that requests authentication information from the external apparatus to carry out an authenticating process on the received e-mail address when the second determining section determines that the received e-mail address is stored in the first storage section, and a fifth registration control section that provides control to delete the received e-mail address from the first storage section and registers the e-mail address in the second storage section when the second authenticating section has succeeded in authentication of the received e-mail address, and to reject registration of the received e-mail address in the second storage section when the second authenticating section has failed in authentication of the received e-mail address.

According to this arrangement, when an e-mail address registered in the first storage section is deleted, it is not only deleted but also registered as a distribution-rejected e-mail address. As a result, it is possible to easily and positively prevent attacks by repeated subscription.

Preferably, the electronic mail distributing apparatus further comprises a second confirmation e-mail sending section that sends a confirmation e-mail, containing authentication information for use in the authenticating process carried out by the second authenticating section, to the e-mail address registered in the first storage section by the first registration control section or the second registration control section.

Preferably, the electronic mail distributing apparatus further comprises a third receiving section that receives an instruction for deleting a desired e-mail address from e-mail addresses stored in the first storage section from at least one of the external apparatus, a third determining section that determines whether the instruction received by the third receiving section includes an instruction for registering the e-mail address desired to be deleted as an e-mail address to which e-mail distribution is to be rejected in the second storage section, and a sixth registration control section that provides control to delete the e-mail address from the first storage section and register the e-mail address in the second storage section when the third determining section determines that the instruction received by the third receiving section includes the instruction for registering the e-mail address in the second storage section, and to delete the e-mail address from the first storage section when the third determining section determines that the instruction received by the third receiving section does not include the instruction for registering the e-mail address in the second storage section.

To attain the above object, in a second aspect of the present invention, there is provided an electronic mail distributing apparatus connected to at least one external apparatus via a network comprises a first storage section that stores e-mail addresses as destinations of e-mails to be distributed, a second storage section that stores e-mail addresses to which e-mail distribution is rejected, a distributing section that distributes desired e-mails addressed to the e-mail addresses stored in the first storage section, a first receiving section that receives an e-mail address as a destination of e-mails to be distributed from at least one of the external apparatus, a first determining section that determines whether the e-mail address received by the first receiving section is stored in the second storage section, a first registration control section that provides control to register the received e-mail address in the first storage section when the first determining section determines that the received e-mail address is not stored in the second storage section, and a second registration control section that provides control to reject registration of the received e-mail address in the first storage section when the first determining section determines that the received e-mail address is stored in the second storage section.

According to this arrangement, the registration of an e-mail address which has been registered for rejection of e-mail distribution is rejected. As a result, it is possible to easily and positively prevent attacks by repeated subscription.

Preferably, the electronic mail distributing apparatus further comprises a second receiving section that receives an e-mail address, to which e-mail distribution is to be rejected, from at least one of the external apparatus, and a third registration control section that provides control to register the e-mail address received by the second receiving section in the second storage section.

Preferably, the electronic mail distributing apparatus further comprises a second receiving section that receives an e-mail address, to which e-mail distribution is to be rejected, from at least one of the external apparatus, a second determining section that determines whether the e-mail address received by the second receiving section is stored in the first storage section, a fourth registration control section that provides control to register the received e-mail address in the second storage section when the second determining section determines that the received e-mail address is not stored in the first storage section, a second authenticating section that requests authentication information from the external apparatus to carry out an authenticating process on the received e-mail address when the second determining section determines that the received e-mail address is stored in the first storage section, and a fifth registration control section that provides control to delete the received e-mail address from the first storage section and registers the e-mail address in the second storage section when the second authenticating section has succeeded in authentication of the received e-mail address, and to reject registration of the received e-mail address in the second storage section when the second authenticating section has failed in authentication of the received e-mail address.

Preferably, the electronic mail distributing apparatus further comprises a third receiving section that receives an instruction for deleting a desired e-mail address from the e-mail addresses stored in the first storage section from at least one of the external apparatus, and a third determining section that determines whether the instruction received by the third receiving section includes an instruction for registering the e-mail address desired to be deleted as an e-mail address to which e-mail distribution is to be rejected in the second storage section, and a sixth registration control section that provides control to delete the e-mail address from the first storage section and register the e-mail address in the second storage section when the third determining section determines that the instruction received by the third receiving section includes the instruction for registering the e-mail address in the second storage section, and to delete the e-mail address from the first storage section when the third determining section determines that the instruction received by the third receiving section does not include the instruction for registering the e-mail address in the second storage section.

To attain the above object, in a third aspect of the present invention, there is provided an e-mail distributing method applied to a computer connected to at least one external apparatus via a network, the computer including a first storage section that stores e-mail addresses to which e-mails are distributed, and a second storage section that stores e-mail addresses to which e-mail distribution is rejected, the method comprises a first receiving step of receiving an e-mail address as a destination of e-mails to be distributed from at least one of the external apparatus, a first determining step of determining whether the e-mail address received in the first receiving step is stored in the second storage section, a first registration control step of providing control to register the received e-mail address in the first storage section when it is determined in the first determining step that the received e-mail address is not stored in the second storage section, a first authenticating step of requesting authentication information from the external apparatus to carry out an authenticating process on the received e-mail address when it is determined in the first determining step that the received e-mail address is stored in the second storage section, and a second registration control step of providing control to register the received e-mail address in the first storage section when the authenticating process has been successfully carried out in the first authenticating step, and to reject registration of the received e-mail address in the first storage section when the authenticating process has been unsuccessfully carried out in the first authenticating step.

Preferably, the e-mail distributing method further comprises a second receiving step of receiving an e-mail address, to which e-mail distribution is to be rejected, from at least one of the external apparatus, and a third registration control step of providing control to register the e-mail address, received in the second receiving step, in the second storage section.

Preferably, the e-mail distributing method further comprises a first confirmation e-mail sending step of sending a confirmation e-mail, containing authentication information for use in the authenticating process carried out in the first authenticating step, to the e-mail address registered in the second storage section in the third registration control step.

Preferably, the e-mail distributing method further comprises a second receiving step of receiving an e-mail address, to which e-mail distribution is to be rejected, from at least one of the external apparatus, a second determining step of determining whether the e-mail address received in the second receiving step is stored in the first storage section, a fourth registration control step of providing control to register the received e-mail address in the second storage section when it is determined in the second determining step that the received e-mail address is not stored in the first storage section, a second authenticating step of requesting authentication information from the external apparatus to carry out an authenticating process on the received e-mail address when it is determined in the second determining step that the received e-mail address is stored in the first storage section, and a fifth registration control step of providing control to delete the received e-mail address from the first storage section and register the e-mail address in the second storage section when the authenticating process has been successfully carried out in the second authenticating step, and to reject registration of the received e-mail address in the second storage section when the authenticating process has been unsuccessfully carried out in the second authenticating step.

Preferably, the e-mail distributing method further comprises a second confirmation e-mail sending step of sending a confirmation e-mail, containing authentication information for use in the authenticating process carried out in the second authenticating step, to the e-mail address registered in the first storage section in the first registration control step or the second registration control step.

Preferably, the e-mail distributing method further comprises a third receiving step of receiving an instruction for deleting a desired e-mail address from e-mail addresses stored in the first storage section from at least one of the external apparatus, a third determining step of determining whether the instruction received in the third receiving step includes an instruction for registering the e-mail address desired to be deleted as an e-mail address to which e-mail distribution is to be rejected in the second storage section, and a sixth registration control step of providing control to delete the e-mail address from the first storage section and register the e-mail address in the second storage section when it is determined in the third determining step that the instruction received in the third receiving step includes the instruction for registering the e-mail address in the second storage section, and to delete the e-mail address from the first storage section when it is determined in the third determining section step that the instruction received in the third receiving step does not include the instruction for registering the e-mail address in the second storage section.

To attain the above object, in a fourth aspect of the present invention, there is provided an e-mail distributing method applied to a computer connected to at least one external apparatus via a network, the computer including a first storage section that stores e-mail addresses as destinations of e-mails to be distributed, and a second storage section that stores e-mail addresses to which e-mail distribution is rejected, the e-mail distributing method comprises a first receiving step of receiving an e-mail address as a destination of e-mails to be distributed from at least one of the external apparatus, a first determining step of determining whether the e-mail address received in the first receiving step is stored in the second storage section, a first registration control step of providing control to register the received e-mail address in the first storage section when it is determined in the first determining step that the received e-mail address is not stored in the second storage section, and a second registration control step of providing control to reject registration of the received e-mail address in the first storage section when it is determined in the first determining step that the received e-mail address is stored in the second storage section.

Preferably, the e-mail distributing method further comprises a second receiving step of receiving an e-mail address, to which e-mail distribution is to be rejected, from at least one of the external apparatus, and a third registration control step of providing control to register the e-mail address received in the second receiving step in the second storage section.

Preferably, the e-mail distributing method further comprises a second receiving step of receiving an e-mail address, to which e-mail distribution is to be rejected, from at least one of the external apparatus, a second determining step of determining whether the e-mail address received in the second receiving step is stored in the first storage section, a fourth registration control step of providing control to register the received e-mail address in the second storage section when it is determined in the second determining step that the received e-mail address is not stored in the first storage section, a second authenticating step of requesting authentication information from the external apparatus to carry out an authenticating process on the received e-mail address when it is determined in the second determining step that the received e-mail address is stored in the first storage section, and a fifth registration control step of providing control to delete the received e-mail address from the first storage section and register the e-mail address in the second storage section when the authenticating process has been successfully carried out in the second authenticating step, and to reject registration of the received e-mail address when the authenticating process has been unsuccessfully carried out in the second authenticating step.

Preferably, the e-mail distributing method further comprises a third receiving step of receiving an instruction for deleting a desired e-mail address from the e-mail addresses stored in the first storage section from at least one of the external apparatus, and a third determining step of determining whether the instruction received in the third receiving step includes an instruction for registering the e-mail address desired to be deleted as an e-mail address to which e-mail distribution is to be rejected in the second storage section, and a sixth registration control step of providing control to delete the e-mail address from the first storage section and register the e-mail address in the second storage section when it is determined in the third determining step that the instruction received in the third receiving step includes the instruction for registering the e-mail address in the second storage section, and to delete the e-mail address from the first storage section when it is determined in the third determining step that the instruction received in the third receiving step does not include the instruction for registering the e-mail address in the second storage section.

To attain the above object, in a fifth aspect of the present invention, there is provided a control program executable by a computer for controlling an electronic mail distributing apparatus connected to at least one external apparatus via a network, the electronic mail distributing apparatus including the computer including a first storage section that stores e-mail addresses to which e-mails are distributed, and a second storage section that stores e-mail addresses to which e-mail distribution is rejected, the control program including a program code for causing the electronic mail distributing apparatus to execute a first receiving step of receiving an e-mail address as a destination of e-mails to be distributed from at least one of the external apparatus, a first determining step of determining whether the e-mail address received in the first receiving step is stored in the second storage section, a first registration control step of providing control to register the received e-mail address in the first storage section when it is determined in the first determining step that the received e-mail address is not stored in the second storage section, a first authenticating step of requesting authentication information from the external apparatus to carry out an authenticating process on the received e-mail address when it is determined in the first determining step that the received e-mail address is stored in the second storage section, and a second registration control step of providing control to register the received e-mail address in the first storage section when the authenticating process has been successfully carried out in the first authenticating step, and to reject registration of the received e-mail address in the first storage section when the authenticating process has been unsuccessfully carried out in the first authenticating step.

Preferably, the control program further includes a program code for causing the electronic mail distributing apparatus to execute a second receiving step of receiving an e-mail address, to which e-mail distribution is to be rejected, from at least one of the external apparatus, and a third registration control step of providing control to register the e-mail address, received in the second receiving step, in the second storage section.

Preferably, the control program further includes a program code for causing the electronic mail distributing apparatus to execute a first confirmation e-mail sending step of sending a confirmation e-mail, containing authentication information for use in the authenticating process carried out in the first authenticating step, to the e-mail address registered in the second storage section in the third registration control step.

Preferably, the control program further includes a program code for causing the electronic mail distributing apparatus to execute a second receiving step of receiving an e-mail address, to which e-mail distribution is to be rejected, from at least one of the external apparatus, a second determining step of determining whether the e-mail address received in the second receiving step is stored in the first storage section, a fourth registration control step of providing control to register the received e-mail address in the second storage section when it is determined in the second determining step that the received e-mail address is not stored in the first storage section, a second authenticating step of requesting authentication information from the external apparatus to carry out an authenticating process on the received e-mail address when it is determined in the second determining step that the received e-mail address is stored in the first storage section, and a fifth registration control step of providing control to delete the received e-mail address from the first storage section and register the e-mail address in the second storage section when the authenticating process has been successfully carried out in the second authenticating step, and to reject registration of the received e-mail address in the second storage section when the authenticating process has been unsuccessfully carried out in the second authenticating step.

Preferably, the control program further includes a program code for causing the electronic mail distributing apparatus to execute a second confirmation e-mail sending step of sending a confirmation e-mail, containing authentication information for use in the authenticating process carried out in the second authenticating step, to the e-mail address registered in the first storage section in the first registration control step or the second registration control step.

Preferably, the control program further includes a program code for causing the electronic mail distributing apparatus to execute a third receiving step of receiving an instruction for deleting a desired e-mail address from e-mail addresses stored in the first storage section from at least one of the external apparatus, a third determining step of determining whether the instruction received in the third receiving step includes an instruction for registering the e-mail address desired to be deleted as an e-mail address to which e-mail distribution is to be rejected in the second storage section, and a sixth registration control step of providing control to delete the e-mail address from the first storage section and register the e-mail address in the second storage section when it is determined in the third determining step that the instruction received in the third receiving step includes the instruction for registering the e-mail address in the second storage section, and to delete the e-mail address from the first storage section when it is determined in the third determining section step that the instruction received in the third receiving step does not include the instruction for registering the e-mail address in the second storage section.

To attain the above object, in a sixth aspect of the present invention, there is provided a control program executable by a computer for controlling an electronic mail distributing apparatus connected to at least one external apparatus via a network, the electronic mail distributing apparatus including a first storage section that stores e-mail addresses as destinations of e-mails to be distributed, and a second storage section that stores e-mail addresses to which e-mail distribution is rejected, the control program including a program code for causing the electronic mail distributing apparatus to a first receiving step of receiving an e-mail address as a destination of e-mails to be distributed from at least one of the external apparatus, a first determining step of determining whether the e-mail address received in the first receiving step is stored in the second storage section, a first registration control step of providing control to register the received e-mail address in the first storage section when it is determined in the first determining step that the received e-mail address is not stored in the second storage section, and a second registration control step of providing control to reject registration of the received e-mail address in the first storage section when it is determined in the first determining step that the received e-mail address is stored in the second storage section.

Preferably, the control program further includes a program code for causing the electronic mail distributing apparatus to execute a second receiving step of receiving an e-mail address, to which e-mail distribution is to be rejected, from at least one of the external apparatus, and a third registration control step of providing control to register the e-mail address received in the second receiving step in the second storage section.

Preferably, the control program further includes a program code for causing the electronic mail distributing apparatus to execute a second receiving step of receiving an e-mail address, to which e-mail distribution is to be rejected, from at least one of the external apparatus, a second determining step of determining whether the e-mail address received in the second receiving step is stored in the first storage section, a fourth registration control step of providing control to register the received e-mail address in the second storage section when it is determined in the second determining step that the received e-mail address is not stored in the first storage section, a second authenticating step of requesting authentication information from the external apparatus to carry out an authenticating process on the received e-mail address when it is determined in the second determining step that the received e-mail address is stored in the first storage section, and a fifth registration control step of providing control to delete the received e-mail address from the first storage section and register the e-mail address in the second storage section when the authenticating process has been successfully carried out in the second authenticating step, and to reject registration of the received e-mail address when the authenticating process has been unsuccessfully carried out in the second authenticating step.

Preferably, the control program further includes a program code for causing the electronic mail distributing apparatus to execute a third receiving step of receiving an instruction for deleting a desired e-mail address from the e-mail addresses stored in the first storage section from at least one of the external apparatus, a third determining step of determining whether the instruction received in the third receiving step includes an instruction for registering the e-mail address desired to be deleted as an e-mail address to which e-mail distribution is to be rejected in the second storage section, and a sixth registration control step of providing control to delete the e-mail address from the first storage section and register the e-mail address in the second storage section when it is determined in the third determining step that the instruction received in the third receiving step includes the instruction for registering the e-mail address in the second storage section, and to delete the e-mail address from the first storage section when it is determined in the third determining step that the instruction received in the third receiving step does not include the instruction for registering the e-mail address in the second storage section.

To attain the above object, in a seventh aspect of the present invention, there is provided a computer-readable storage medium storing a control program executable by a computer for controlling an electronic mail distributing apparatus connected to at least one external apparatus via a network, the electronic mail distributing apparatus including the computer including a first storage section that stores e-mail addresses to which e-mails are distributed, and a second storage section that stores e-mail addresses to which e-mail distribution is rejected, the control program including a program code for causing the electronic mail distributing apparatus to execute a first receiving step of receiving an e-mail address as a destination of e-mails to be distributed from at least one of the external device, a first determining step of determining whether the e-mail address received in the first receiving step is stored in the second storage section, a first registration control step of providing control to register the received e-mail address in the first storage section when it is determined in the first determining step that the received e-mail address is not stored in the second storage section, a first authenticating step of requesting authentication information from the external apparatus to carry out an authenticating process on the received e-mail address when it is determined in the first determining step that the received e-mail address is stored in the second storage section, and a second registration control step of providing control to register the received e-mail address in the first storage section when the authenticating process has been successfully carried out in the first authenticating step, and to reject registration of the received e-mail address in the first storage section when the authenticating process has been unsuccessfully carried out in the first authenticating step.

To attain the above object, in a eighth aspect of the present invention, there is provided a computer-readable storage medium storing a control program executable by a computer for controlling an electronic mail distributing apparatus connected to at least one external apparatus via a network, the electronic mail distributing apparatus including the computer including a first storage section that stores e-mail addresses to which e-mails are distributed, and a second storage section that stores e-mail addresses to which e-mail distribution is rejected, the control program including a program code for causing the electronic mail distributing apparatus to execute a first receiving step of receiving an e-mail address as a destination of e-mails to be distributed from at least one of the external apparatus, a first determining step of determining whether the e-mail address received in the first receiving step is stored in the second storage section, a first registration control step of providing control to register the received e-mail address in the first storage section when it is determined in the first determining step that the received e-mail address is not stored in the second storage section, and a second registration control step of providing control to reject registration of the received e-mail address in the first storage section when it is determined in the first determining step that the received e-mail address is stored in the second storage section.

The above and other objects, features, and advantages of the invention will become more apparent from the following detailed description taken in conjunction with the accompanying drawings.

BRIEF DESCRIPTION OF THE DRAWINGS

FIG. 4 is a view showing a subscription rejection screen displayed by the subscribing process;

FIG. 14 is a view showing the contents of a subscription confirmation e-mail;

FIG. 18 is a view showing a distribution rejection registration confirmation e-mail; and FIGS. 19A and 19B are views showing examples of e-mails for use in subscribing, in which:

FIG. 19A is a view showing an example of an e-mail for use in subscribing for the first time; and FIG. 19B is a view showing an example of an e-mail with an authentication key added to the body thereof.

DETAILED DESCRIPTION OF THE PREFERRED EMBODIMENTS

The present invention will now be described in detail with reference to the drawings showing preferred embodiments thereof.

Figure 1:
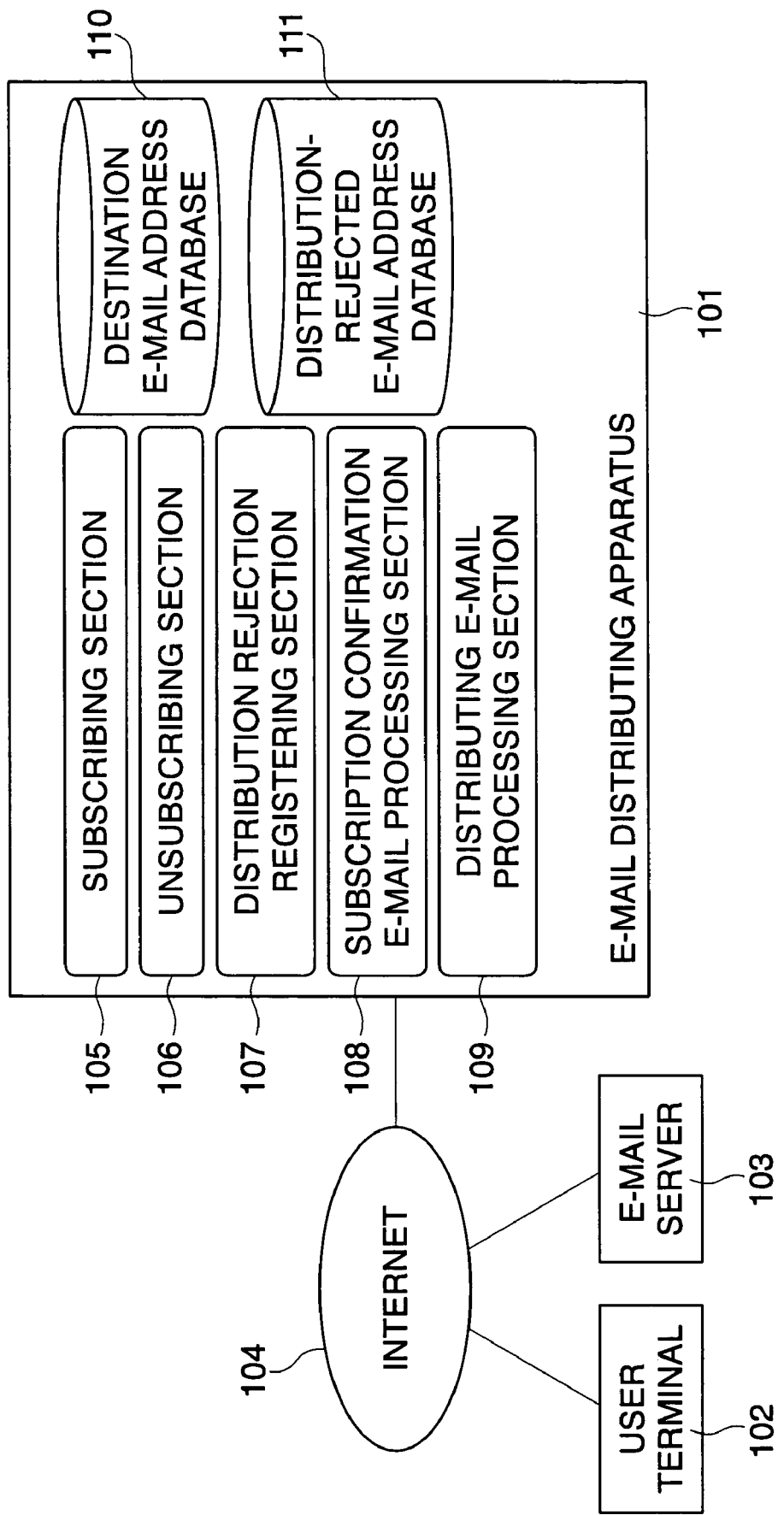
FIG. 1 is a block diagram showing the construction of an electronic mail distributing apparatus according to a first embodiment of the present invention.

FIG. 1 is a block diagram showing the construction of an electronic mail (hereinafter referred to as "e-mail") distributing apparatus according to a first embodiment of the present invention.

The e-mail distributing apparatus 101, a user terminal 102 which receives e-mails, and an e-mail server 103 which stores e-mails addressed to the user are connected to the Internet 104, so that they can communicate with each other on the Internet 104. The e-mail distributing apparatus 101 delivers e-mails to the electronic mail server 103, and the user terminal 102 accesses the e-mail server 103 to receive e-mails addressed to the user.

The e-mail distributing apparatus 101 is comprised of a subscribing section 105 which accepts registration of e-mail addresses as destinations of e-mails to be distributed (hereinafter referred to as "the subscribing process"), an unsubscribing section 106 which deletes e-mail addresses registered as destinations of e-mails to be distributed (hereinafter referred to as "the unsubscribing process"), a distribution rejection registering section 107 which registers e-mail addresses to which e-mail distribution is rejected (hereinafter referred to as "the distribution rejection registration process), a subscription confirmation e-mail processing section 108 which generates a confirmation e-mail to ascertain whether an e-mail address for subscription has been registered by the user who owns the e-mail address, and delivers the generated confirmation e-mail to an e-mail address registered in the subscribing section 105 (hereinafter referred to as "the subscription confirmation e-mail process), a distributing e-mail processing section 109 that performs processing required for e-mail distribution, a destination e-mail address DB (hereinafter referred to as "the first database") 110 which stores e-mail addresses registered as destinations of e-mails to be distributed, and a distribution-rejected e-mail address DB (hereinafter referred to as "the second database") 111 which stores e-mail addresses to which e-mail distribution rejection has been registered.

Figure 2:
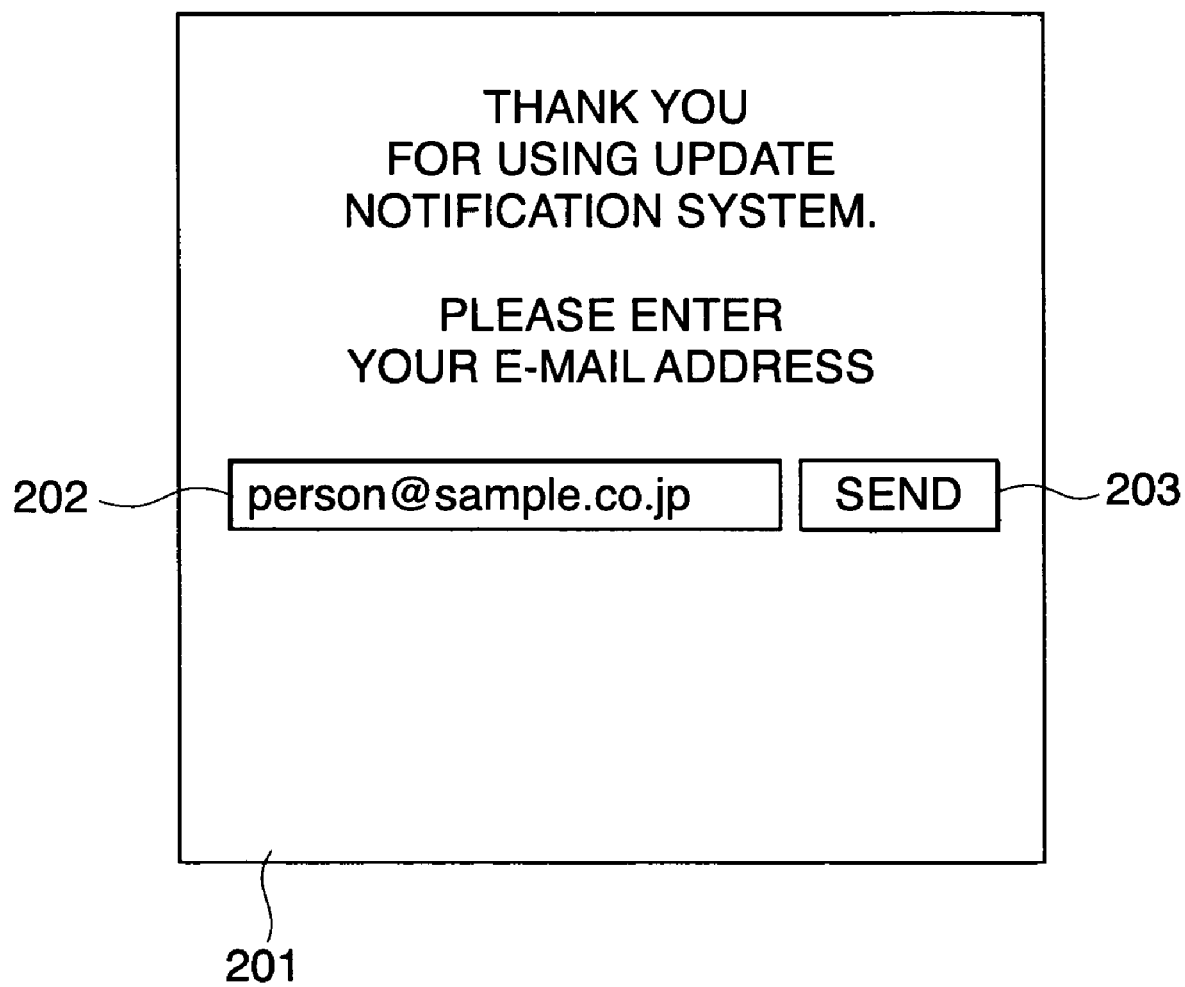
FIG. 2 is a view showing a subscription form screen.

The subscribing section 105 carries out the subscribing process based on the operation of the user terminal 102 via the Internet 104. FIG. 2 is a view showing an entry form screen for subscribing.

The entry form screen 201 is described in HTML (Hypertext Markup Language), and is displayed when the user of the user terminal 102 accesses a specific URL using a browser (HTML viewer) of the user terminal 102. In the present embodiment, it is assumed that the e-mail distributing apparatus 101 serves as an update notification apparatus that distributes an e-mail for notifying the user of the latest update of a Web page. The user enters his/her e-mail address as a destination of e-mails to be distributed in a box 202, and then depresses a send button 203, so that the e-mail address is sent to the e-mail distributing apparatus 101 which registers the e-mail address as a destination of e-mails to be distributed.

Figure 3:
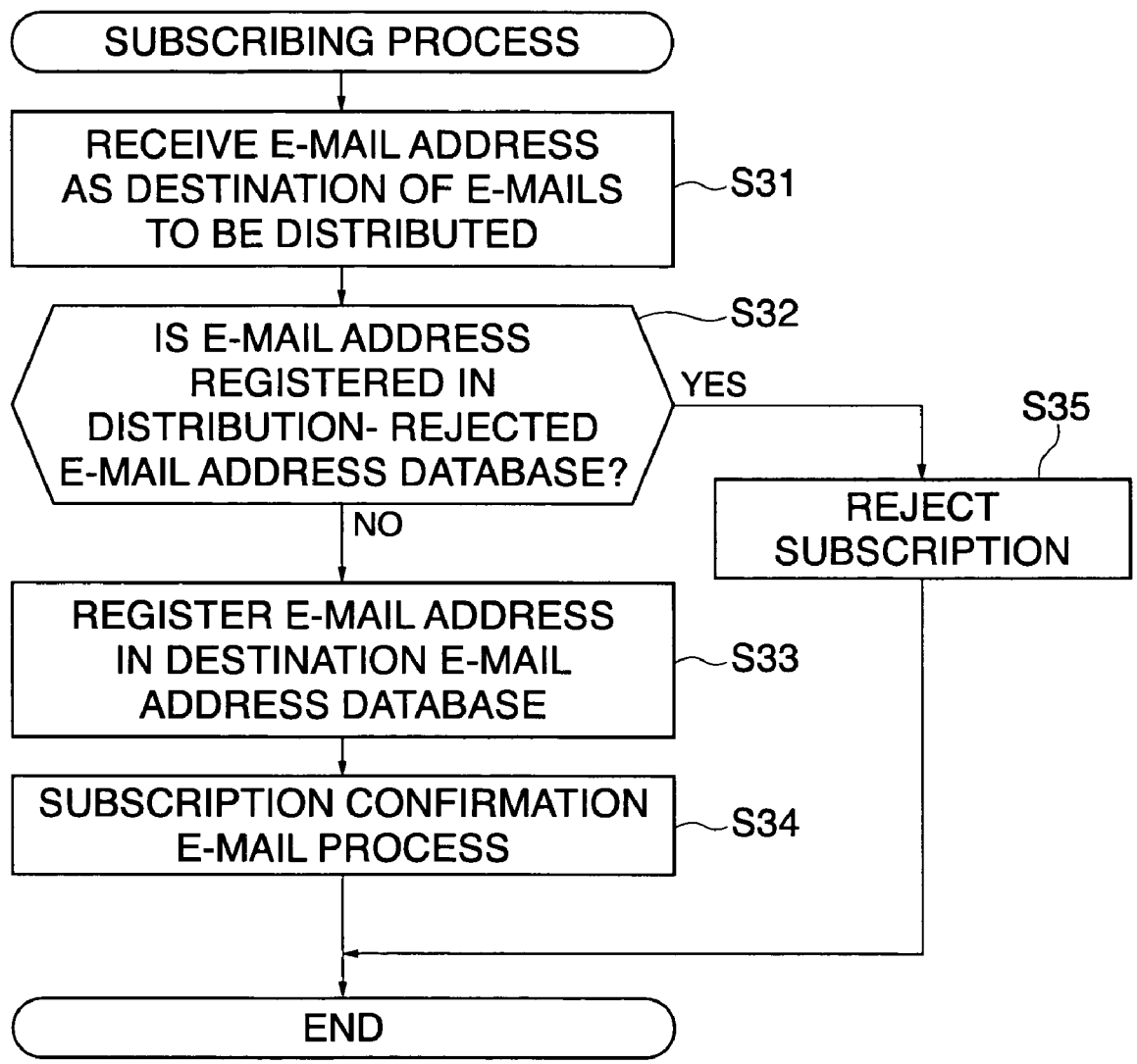
FIG. 3 is a flow chart showing a subscribing process carried out by a subscribing section 105.

FIG. 3 is a flow chart showing the subscribing process carried out by the subscribing section 105.

Upon receipt of an e-mail address, which is entered using the entry form screen 201 as a desired address to be registered as a destination of e-mails to be distributed (step S31), the subscribing section 105 checks whether the e-mail address is registered in the second database 111 or not (step S32). If the e-mail address is not registered in the second database 111, the e-mail address is registered in the first database 110 (step S33), and the process then proceeds to a step S34 wherein the subscription confirmation e-mail process is carried out to ascertain whether the e-mail address has been registered by the user who owns the e-mail address. If it is found in the step S32 that the e-mail address received in the step S31 is registered in the second database 111, the registration of the e-mail address is rejected since the rejection of distribution to the e-mail address has been previously accepted (step S35).

FIG. 4 is a subscription rejection screen displayed in the step S35. The subscription rejection screen is a Web page indicating a subscription rejection message 601. The subscription rejection message 601 is sent to the browser of the user terminal 102 in response to the transmission of the e-mail address from the entry form 201.

Figures 5, 6:
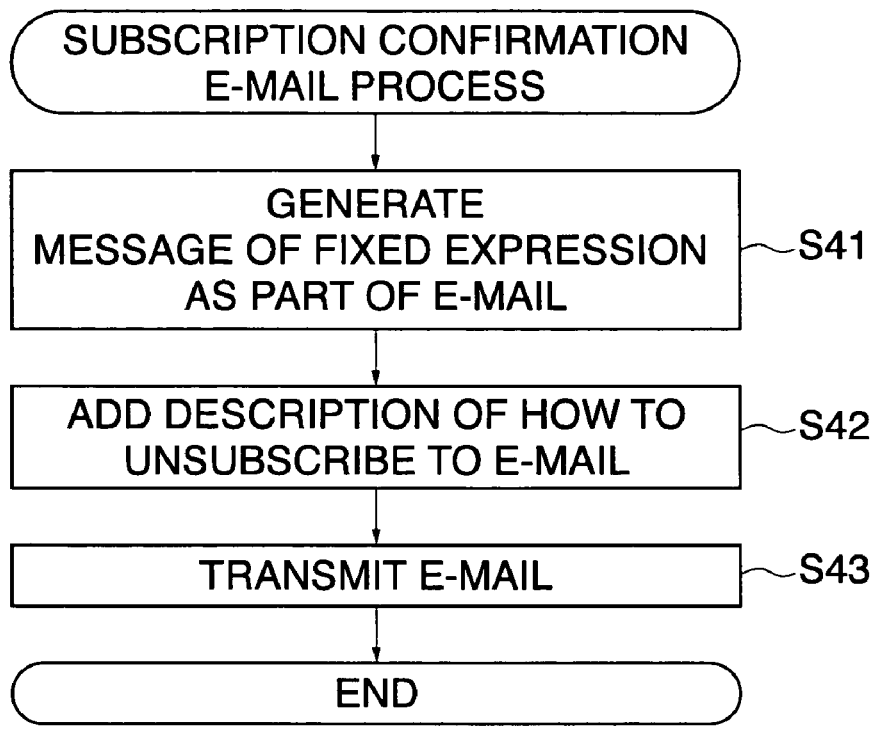
FIG. 5 is a flow chart showing a subscription confirmation e-mail process.
FIG. 6 is a view showing the contents of a subscription confirmation e-mail.

A detailed description will now be given of the subscription confirmation e-mail process in the step S34 with reference to a flow chart of FIG. 5 showing the same process as well as FIG. 6 showing the contents of a subscription confirmation e-mail. The subscription confirmation e-mail process is carried out by the subscription confirmation e-mail processing section 108.

First, a message of a fixed expression as a part of an e-mail is generated (step S41), and then a description of instructions on how to issue an unsubscribe request to the unsubscribing section 106 is added to the e-mail (step S42). In the case where unsubscribing is performed through the operation of the user terminal 102 via the Internet 104, the URL of a Web page for unsubscribing is included in the instructions, and the user is instructed to access the Web page using the browser of the user terminal 102. Reference numeral 501 in FIG. 6 indicates the description added in the step S42. The e-mail thus produced is sent to the user terminal 102 (step S43).

Figure 7:
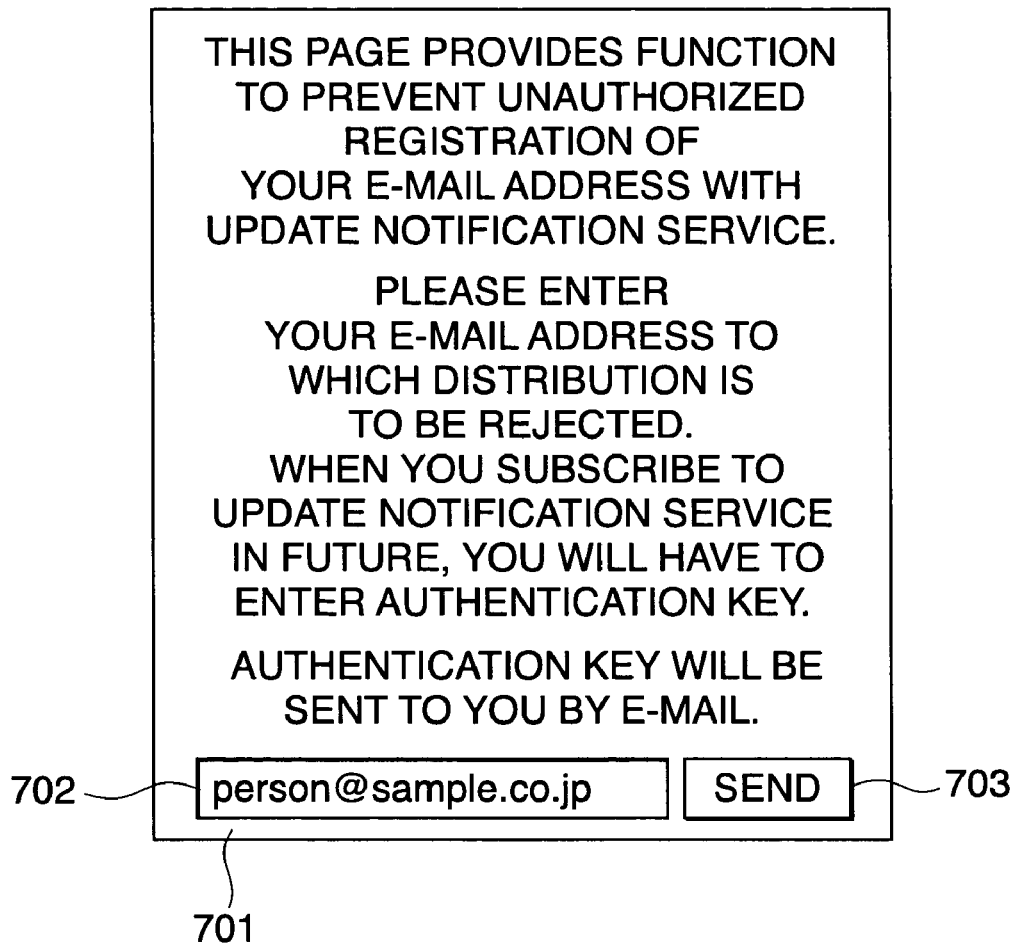
FIG. 7 is a view showing a distribution rejection registration entry form screen for use in registration of distribution rejection.

FIG. 7 is a view showing a distribution rejection registration entry form screen which is used when the distribution rejection registration process is carried out.

A distribution rejection registration entry form screen 701 is displayed as a Web page as shown in FIG. 7, for the user. To reject e-mail distribution, the user enters his/her e-mail address in an entry form 702 and then depresses a send button 703, so that the e-mail address is sent to the distribution rejection registering section 107.

Figure 8:
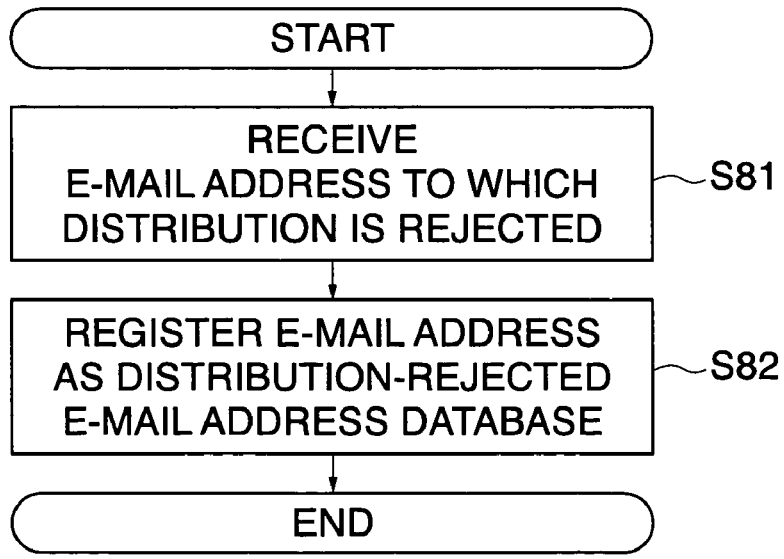
FIG. 8 is a flow chart showing a distribution rejection registration process carried out by a distribution rejection registering section 107.

FIG. 8 is a flow chart showing the distribution rejection registration process carried out by the registration rejection registering section 107.

Upon receipt of an e-mail address, to which e-mail distribution is rejected using the distribution rejection registration entry form screen 701 (step S81), the distribution rejection registering section 107 registers the e-mail address in the second database 111 (step S82).

Figure 9:
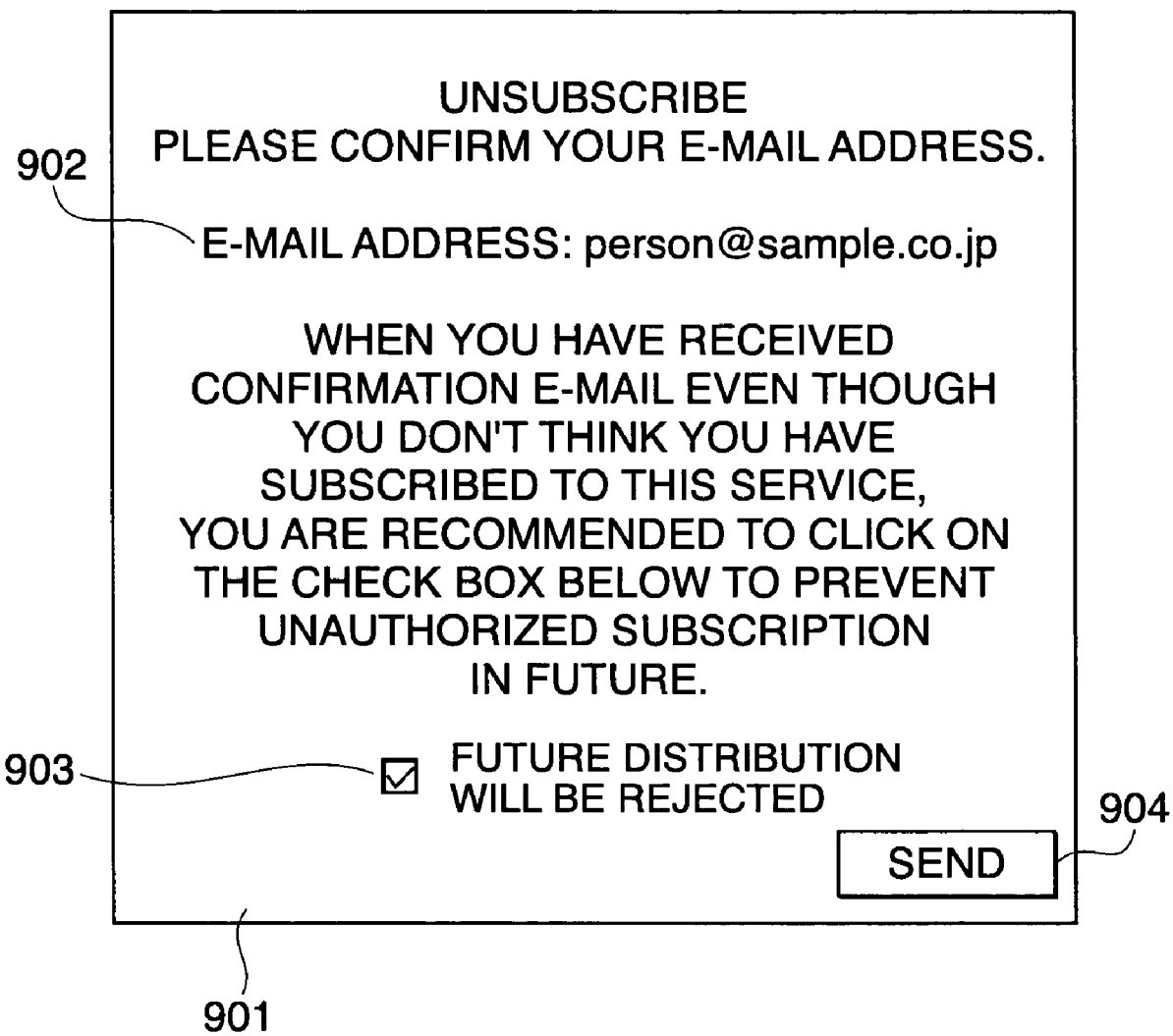
FIG. 9 is a view showing an unsubscription entry form screen for use in unsubscription.

FIG. 9 is a view showing an unsubscription form screen which is used when the unsubscribing process is carried out.

An unsubscribe form screen 901 is displayed as a Web page which is obtained by accessing a URL indicated by reference numeral 501 in FIG. 6. To unsubscribe, the user ascertains whether an e-mail address as indicated by reference numeral 902 in FIG. 9 is correct or not. If the user does not only wish to unsubscribe but also to prevent the e-mail address from being registered by unauthorized third parties, he/she checks off a check box 903. The user then depresses a send button 904, so that an unsubscribe instruction and information indicative of whether the check box 903 is checked off or not as described above are sent to the unsubscribing section 106.

Figure 10:
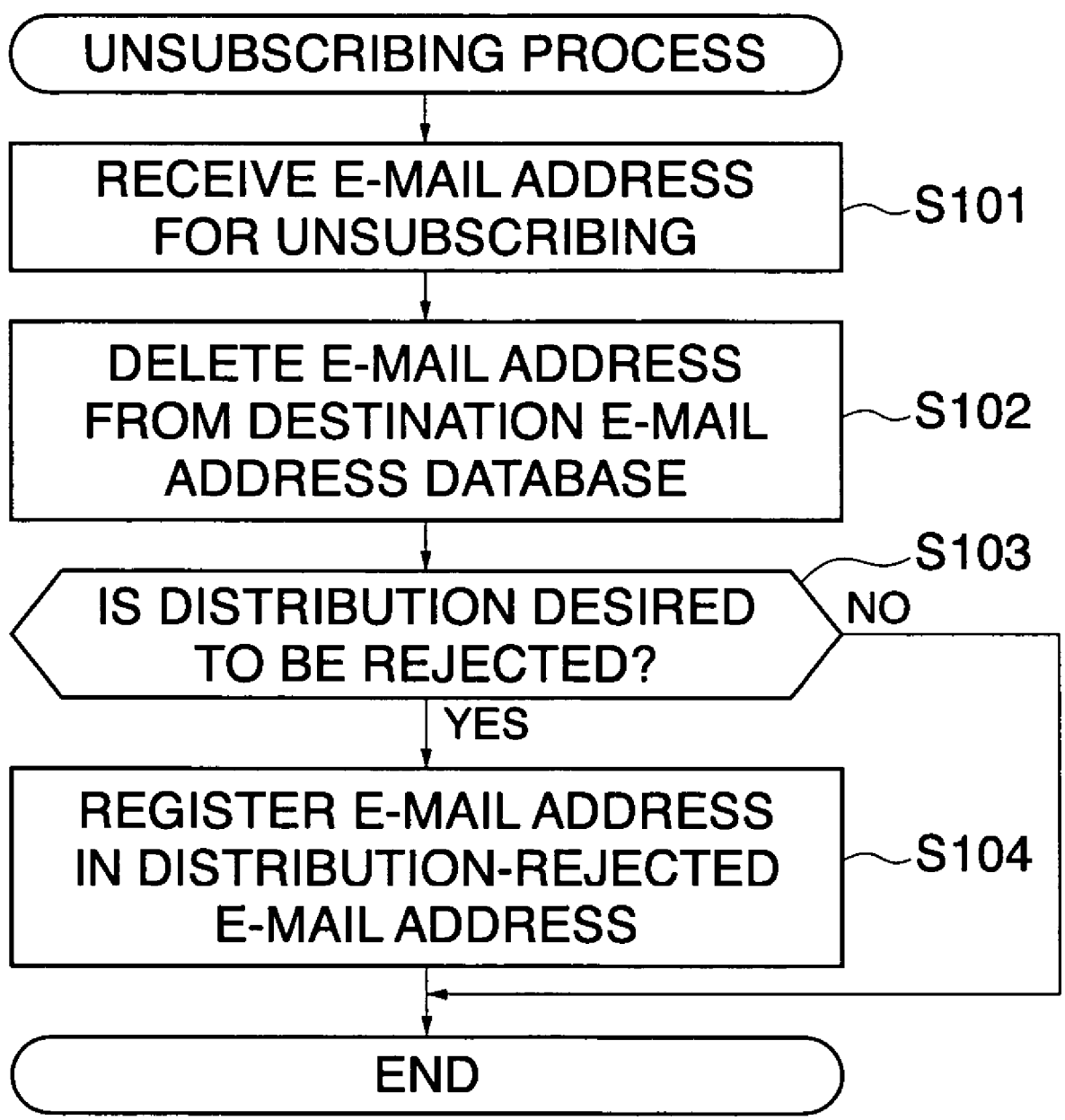
FIG. 10 is a flow chart showing an unsubscribing process carried out by an unsubscribing section 106.

FIG. 10 is a flow chart showing the unsubscribing process carried out by the unsubscribing section 106.

Upon receipt of an e-mail address for unsubscribing entered using the unsubscribe form 901 (step S101), the unsubscribing section 106 deletes the e-mail address from the first database 110 (step S102). Then, whether e-mail distribution to the e-mail address is rejected or not is checked according to information indicative of whether the check box 903 is checked or not (step S103), and if the determination result is positive (YES), the e-mail address is registered in the second database 111 (step S104).

It should be noted that the above described control can be realized by executing programs which are prepared in accordance with the flow charts of FIGS. 3, 5, 8 and 10 and stored in a storage device incorporated in the e-mail distributing apparatus 101.

As described above, according to the present embodiment, when the unsubscribing process is carried out, an e-mail address is not only deleted but also registered as a distribution-rejected e-mail address, and hence it is possible to easily and positively prevent attacks by repeated subscription. Further, the subscribing section 105 rejects registration of the distribution-rejected e-mail address, and hence it is possible to easily and positively prevent attacks by repeated subscription. Further, the distribution rejection registering section 107 is provided to carry out the distribution rejection registration process even when the unsubscribing process is not carried out, and hence attacks by repeated subscription can be prevented in advance. Further, it is possible to prevent attacks using an update notification apparatus which distributes e-mails to registered e-mail addresses to notify users of the latest update of a Web page.

A description will now be given of an e-mail distributing apparatus which carries out the subscribing process using an authentication key according to a second embodiment of the present invention.

Figure 11:
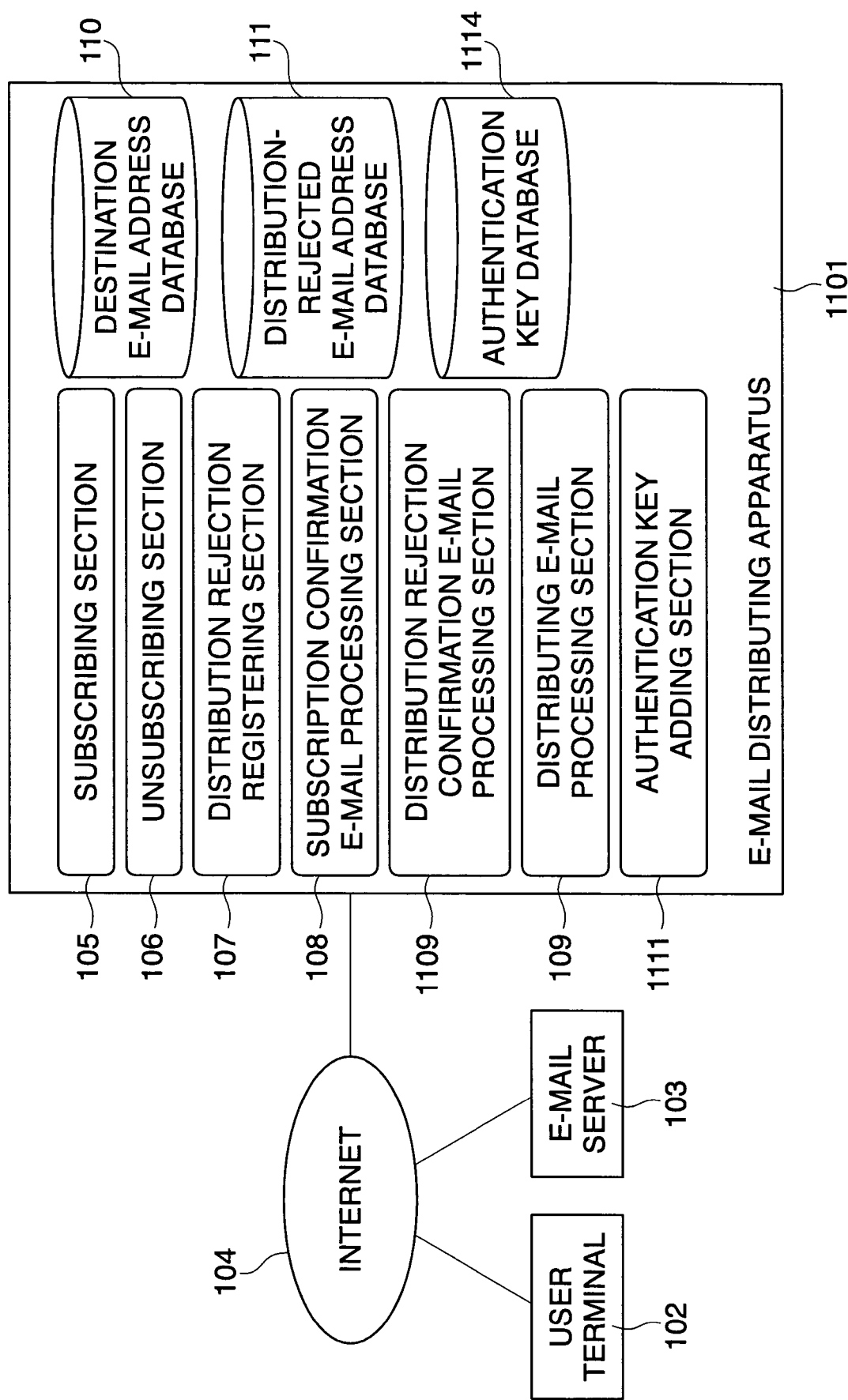
FIG. 11 is a block diagram showing the construction of an electronic mail distributing apparatus according to a second embodiment of the present invention.

FIG. 11 is a block diagram showing the construction of the e-mail distributing apparatus according to the second embodiment.

In addition to the component parts constituting the e-mail distributing apparatus 101 according to the first embodiment described above with reference to FIG. 1, an e-mail distributing apparatus 1101 according to the second embodiment is comprised of a distribution rejection confirmation e-mail processing section 1109 which generates an e-mail for confirming that e-mail distribution has been rejected; an authentication key adding section 1111 which adds an authentication key, which is used for ascertaining whether or not an e-mail address has been registered in the subscribing section 105 and the distribution rejection registering section 107 by the user who owns the e-mail address, to the e-mails generated by the subscription confirmation e-mail processing section 108 and the distribution rejection confirmation e-mail processing section 1109; and an authentication key database 1114 which stores the authentication key generated by the authentication key adding section 1111.

In the present embodiment, the same entry form as in FIG. 2 is used for subscribing.

Figure 12:
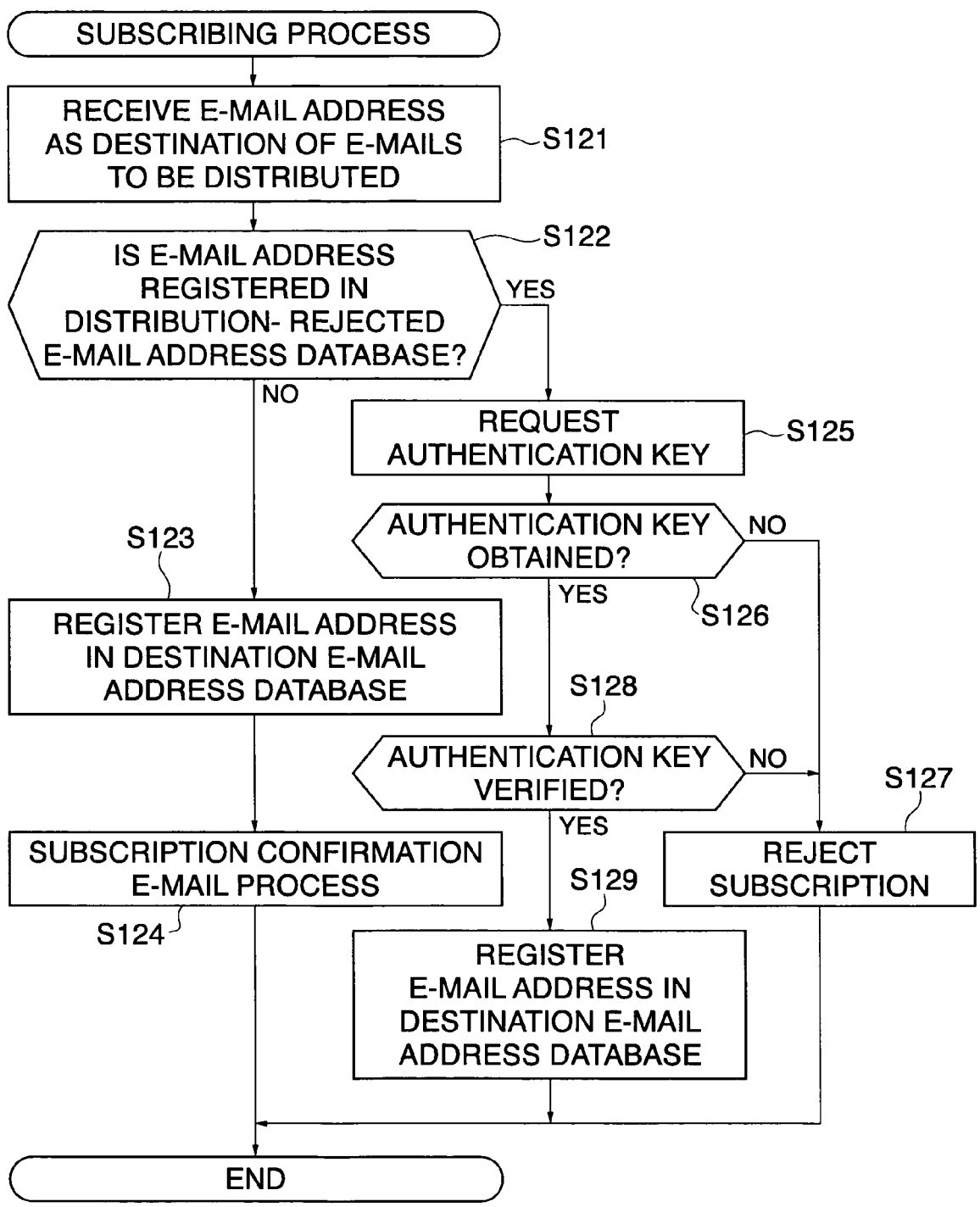
FIG. 12 is a flow chart showing a subscribing process carried out by the subscribing section 105.

FIG. 12 is a flow chart showing the subscribing process carried out by the subscribing section 105 according to the second embodiment.

Upon receipt of an e-mail address which is entered using the entry form screen 201 as a desired address to be registered as a destination of e-mails to be distributed (step S121), the subscribing section 105 checks whether the e-mail address is registered in the second database 111 or not (step S122). If the e-mail address received in the step S121 is not registered in the second database 111, the e-mail address is registered in the first database 110 (step S123), and the process then proceeds to a step S124 where the subscription confirmation e-mail process is carried out to ascertain whether the e-mail address has been registered by the user who owns the e-mail address (step S124).

If it is found in the step S122 that the e-mail address received in the step S121 is registered in the second database 111, the subscribing section 105 requests the entry of an authentication key to ascertain whether or not it is authorized to reverse the previous rejection of e-mail distribution, i.e. whether or not the e-mail address has been registered by the user who owns the e-mail address (step S125). If the authentication key is not obtained from the user terminal 102 in response to the request (step S126), the subscribing section 105 determines that the e-mail address received in the step S121 has not been registered by the user who owns the e-mail address, and then rejects registration of the e-mail address (step S127). On the other hand, if the authentication key is obtained from the user terminal 102 in the step S126, the authentication key is collated with an authentication key stored in the authentication key database 1114 (step S128).

If the authentication key has been verified, the e-mail address is registered in the first database 110 (step S129). If the authentication key has not been verified, the step 127 is executed. It may be configured such that when the authentication key has not been verified in the step S126 or S128, the process returns to the step S125 a prescribed number of times so that a remedy can be provided for a failure in authentication caused by erroneous operation by the user who owns the e-mail address.

Figure 13:
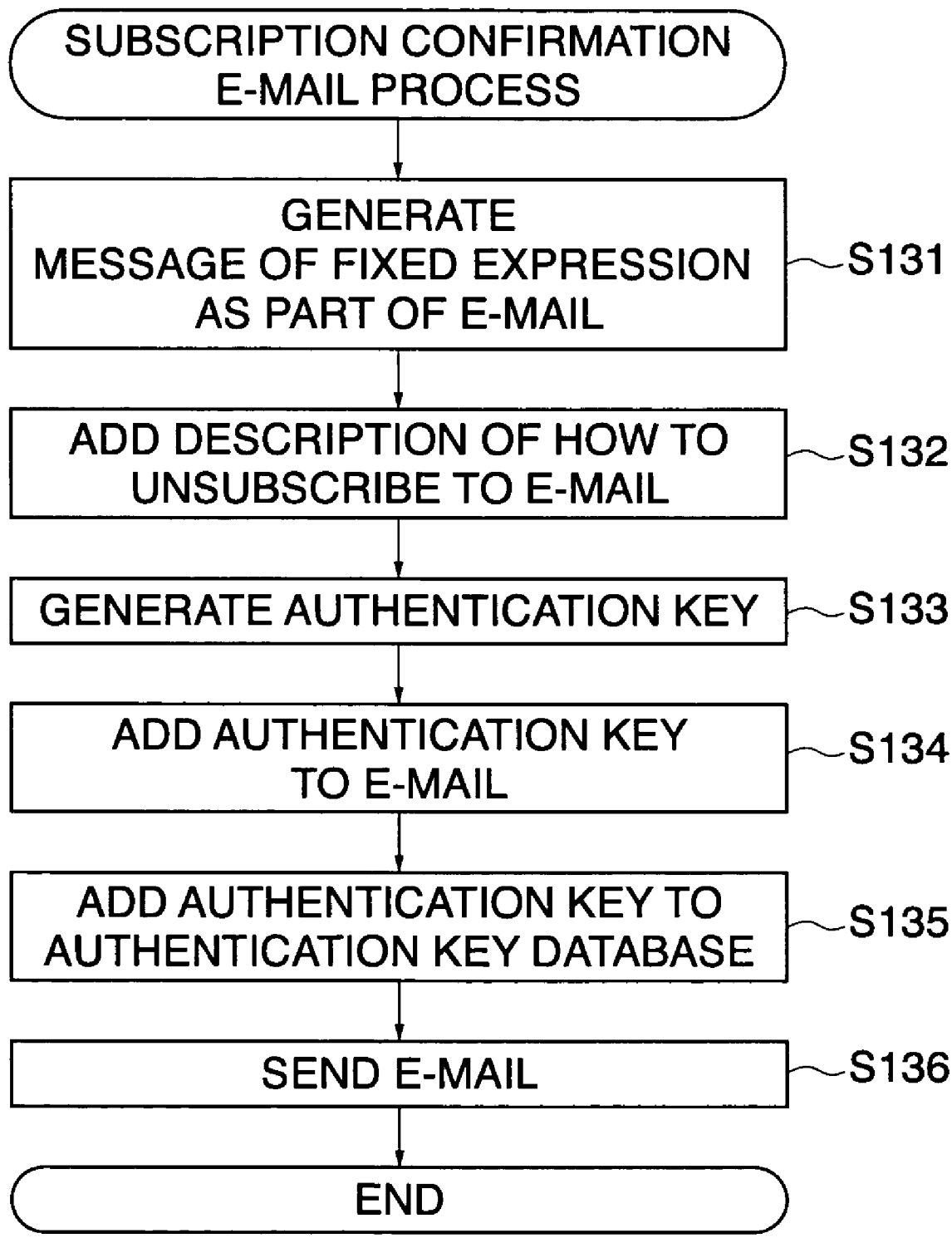
FIG. 13 is a flow chart showing in detail a subscription confirmation e-mail process.

FIG. 13 is a flow chart showing in detail the subscription confirmation e-mail process carried out in the step S124 in FIG. 12, and FIG. 14 is a view showing the contents of a subscription confirmation e-mail. The subscription confirmation e-mail process is carried out by the subscription confirmation e-mail processing section 108 and the authentication key adding section 1111.

First, a message of a fixed expression as a part of an e-mail is generated (step S131), and a description of instructions on how to issue an unsubscribing request to the unsubscribing section 106 is added to the e-mail (step S132). In the case where unsubscribing is performed through the operation of the user terminal 102 via the Internet 104, the URL of a Web page for unsubscribing is included in the instructions, and the user is instructed to access the Web page via the browser of the user terminal 102 (the URL is indicated by reference numeral 1401 in FIG. 14).

Then, the authentication key adding section 1111 generates an authentication key (step S133), and adds the authentication key to the e-mail (step S134). Further, the generated authentication key is stored in the authentication key database 1114 (step S135) (the authentication key is indicated by reference numeral 1402 in FIG. 14). The e-mail thus produced is sent to the user terminal 102 (step S136).

Figure 15:
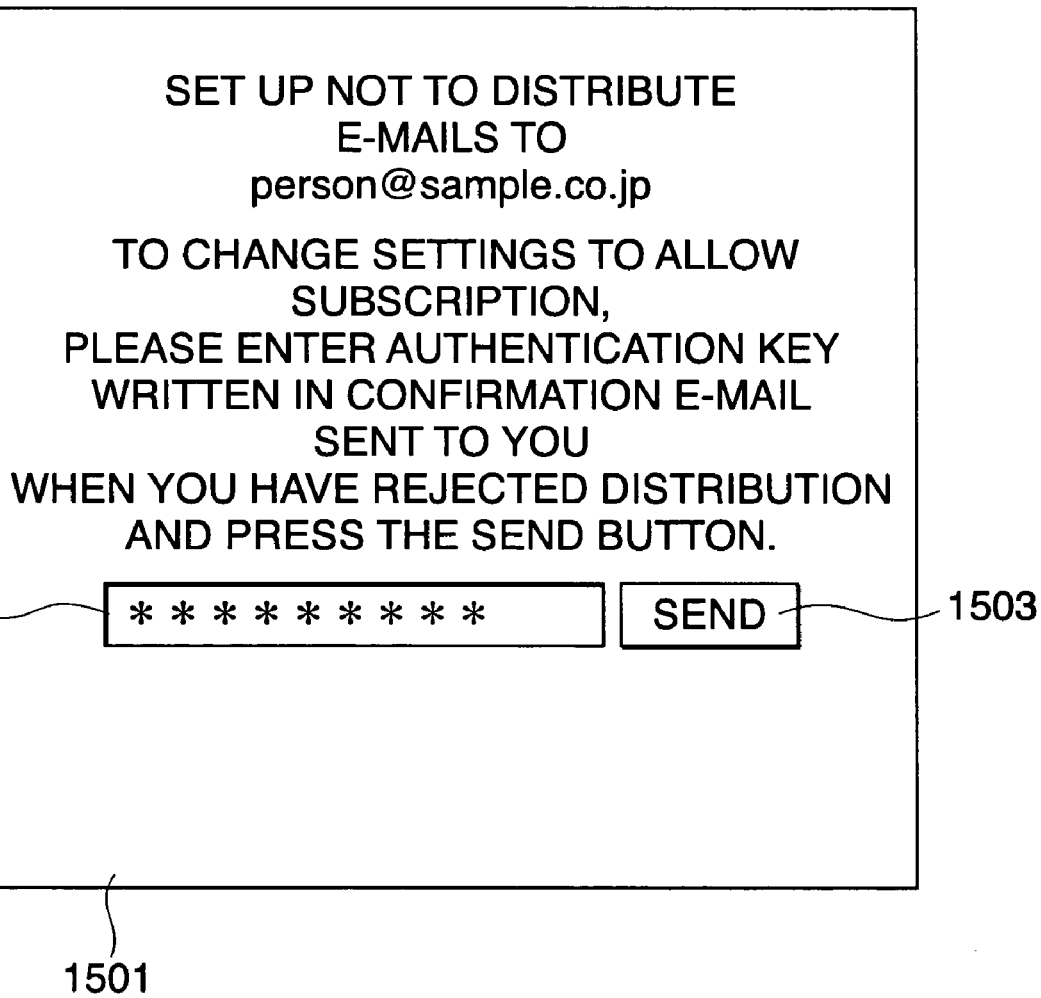
FIG. 15 is a view showing an example of an authentication key request form screen.

FIG. 15 is a view showing an example of an authentication key request form screen used in the step S125 in FIG. 12.

An authentication key request form screen 1501 is displayed as a Web page, which is sent to the browser of the user terminal 102 in response to the transmission of an e-mail address from the user terminal 102. When the user enters an authentication key in an entry form 1502 and then depresses a send button 1503, the subscribing section 105 executes the step S128.

In the present embodiment, the same entry form screen as in FIG. 7 is used when the distribution rejection registration process is carried out.

Figure 16:
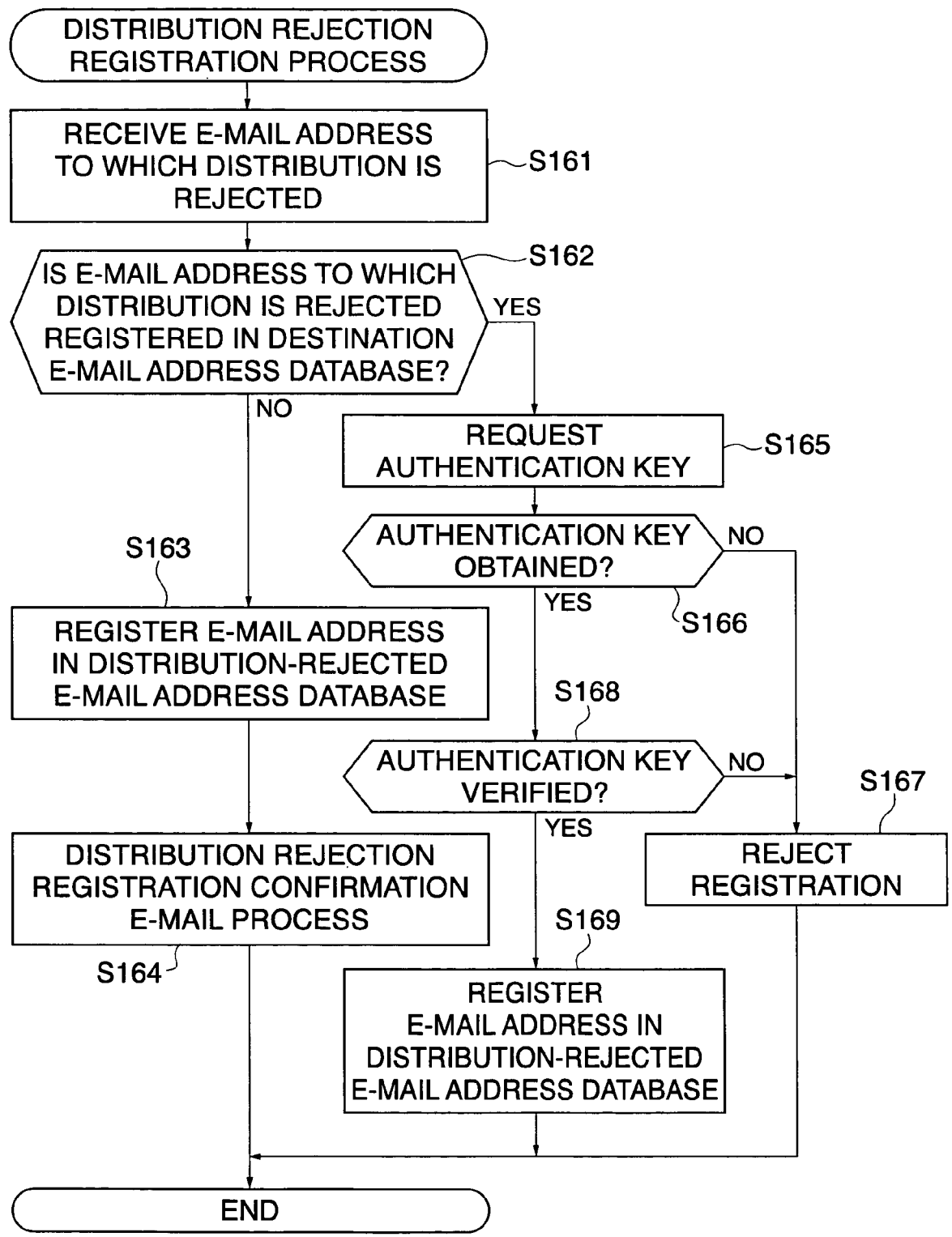
FIG. 16 is a flow chart showing a distribution rejection registration process carried out by the distribution rejection registering section 107.

FIG. 16 is a flow chart showing the distribution rejection registration process carried out by the distribution rejection registering section 107.

Upon receipt of an e-mail address, to which e-mail distribution is rejected using the distribution rejection registration form 701 (step S161), the distribution rejection registering section 107 checks whether the e-mail address is registered in the first database 110 or not (step S162). If the e-mail address is not registered in the first database 110, the e-mail address is registered in the second database 111 (step S163), and the process then proceeds to a step S164 where the distribution rejection registration confirmation e-mail process is carried out to ascertain whether the e-mail address has been registered by the user who owns the e-mail address (step S164).

On the other hand, if it is found in the step S162 that the e-mail address is registered in the first database 110, the distribution rejection registering section 107 requests the entry of an authentication key to ascertain whether or not it is authorized to reverse the previous subscription, i.e. whether or not the e-mail address to which e-mail distribution rejection registration has been made by the user who owns the e-mail address (step S165). If the authentication key is not obtained from the user terminal 102 (step S166), the distribution rejection registering section 107 determines that the e-mail address received in the step S161 has not been registered by the user who owns the e-mail address, and then rejects registration of the e-mail address (step S167).

If the authentication key is obtained from the user terminal 102 in the step S166, the authentication key is collated with an authentication key stored in the authentication key database 1114. If the authentication key has been verified, the e-mail address is registered in the second database 111 (step S169). On the other hand, if the authentication key has not been verified, the step S167 is executed. It may be configured such that when the authentication key has not been verified in the step S166 or S168, the process returns to the step S165 a prescribed number of times so that a remedy can be provided for a failure in authentication caused by erroneous operation by the user who owns the e-mail address.

Figure 17:
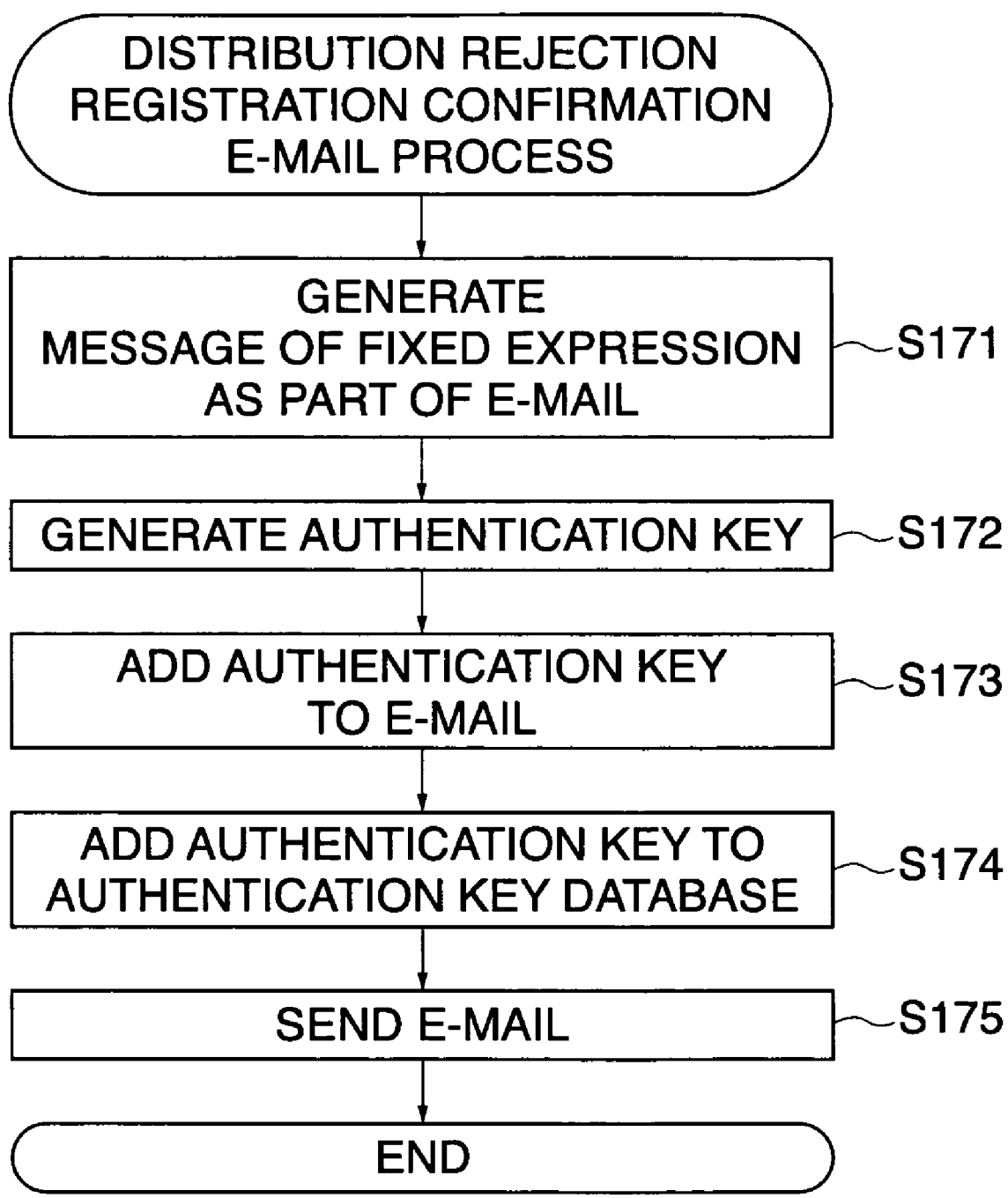
FIG. 17 is a flow chart showing in detail a distribution rejection registration confirmation e-mail process.

FIG. 17 is a flow chart showing in detail the distribution rejection registration confirmation e-mail process carried out in the step S164 in FIG. 16, and FIG. 18 is a view showing a distribution rejection registration confirmation e-mail. The distribution rejection registration confirmation e-mail process is carried out by the distribution rejection registration confirmation e-mail processing section 1109 and the authentication key adding section 1111.

First, the distribution rejection registration confirmation e-mail processing section 1109 generates a message of a fixed expression as a part of an e-mail (step S171). Then, the authentication key adding section 1111 generates an authentication key (step. S172), and adds the authentication key to the e-mail (step S173) (the authentication key is indicated by reference numeral 1801 in FIG. 18). The generated authentication key is stored in the authentication key database 1114 (step S174). The e-mail thus produced is sent to the user terminal 102 (step S175).

It should be noted that the same entry form as in FIG. 9 is used for unsubscribing, and the same process as in FIG. 10 is carried out by the unsubscribing section 106.

As described above, according to the present embodiment, the authenticating process in which it is ascertained whether or not an e-mail address to be registered for subscription has been registered by the user who owns the e-mail address is additionally carried out in the subscription process according to the first embodiment, and hence it is possible to discriminate whether a request to subscribe has been made by the user who owns the e-mail address or not. The authenticating process makes it possible to safely carry out the subscribing process in the case where e-mail distribution has been rejected to prevent attacks. Further, since the authenticating process in which it is ascertained whether or not an e-mail address has been registered by the user who owns the e-mail address is additionally carried out in the subscribing process according to the first embodiment, it is possible to prevent attacks by unauthorized e-mail distribution rejection registration.

It should be noted the above described control can be realized by executing programs which are prepared in accordance with the flow charts of FIGS. 12, 13, 16, and 17 and stored in a storage device incorporated in the e-mail distributing apparatus 101.

It should be understood that the present invention is not limited to the embodiments described above, but various variations of the above described embodiments may be possible without departing from the spirits of the present invention. For example, in the first and second embodiments, the subscribing process and the distribution rejection registration process are carried out via a Web page, but may be carried out via an e-mail. FIGS. 19A and 19B are views showing the contents of e-mails which are sent from the user to the subscribing section 105.

To subscribe for the first time, the user types only a word "subscribe" in the body of an e-mail. As a response to this mail, the e-mail in FIG. 6 is used as in the case where a Web page is sent as a response. In the case where the e-mail distribution rejection registration has been made when a subscription e-mail 2001 appearing in FIG. 19A is received, the e-mail, distributing apparatus does not carry out the subscribing process, and does not respond with a mail which corresponds to the subscription rejection message 601 appearing in FIG. 4 and the authentication key request form screen 1501 appearing in FIG. 15, because such a mail may be used for attack.

To subscribe using an e-mail in the case where the e-mail distribution rejection registration has been made, a subscription e-mail with an authentication key added to the body thereof like an e-mail 2002 in FIG. 19B is sent. The same method is used for registration of e-mail distribution rejection.

Further, although in the above described embodiments, a subscription confirmation e-mail and a distribution rejection registration confirmation e-mail are produced, the present invention is not limited to this, but an e-mail which functions as a confirmation e-mail may be distributed. In this case, instructions on how to unsubscribe and an authentication key are described in each e-mail to be distributed.

The present invention is not limited to the electronic mail distributing apparatus according to the above described embodiments, but the present invention may either be applied to a system composed of a plurality of apparatuses or to a single apparatus.

It goes without saying that the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-mentioned embodiments on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

What is claimed is:

1. An electronic mail distributing apparatus connected to at least one external apparatus via a network, comprising:
a first storage section that stores e-mail addresses as destinations of e-mails to be distributed;
a second storage section that stores e-mail addresses to which e-mail distribution is rejected;
a distributing section that distributes desired e-mails addressed to the e-mail addresses stored in said first storage section;
a first receiving section that receives an e-mail address as a destination of e-mails to be distributed from at least one of the external apparatus;
a first determining section that determines whether the e-mail address received by said first receiving section is stored in said second storage section;
a first registration control section that provides control to register the received e-mail address in said first storage section when said first determining section determines that the received e-mail address is not stored in said second storage section;
a first authenticating section that requests authentication information from the external apparatus to carry out an authenticating process on the received e-mail address when said first determining section determines that the received e-mail address is stored in said second storage section;
a second registration control section provides control to register the received e-mail address in said first storage section when said first authenticating section has succeeded in authentication of the received e-mail address, and to reject registration of the received e-mail address in said first storage section when said first authenticating section has failed in authentication of the received e-mail address;
a second receiving section that receives an e-mail address, to which e-mail distribution is to be rejected, from at least one of the external apparatus;
a second determining section that determines whether the e-mail address received by said second receiving section is stored in said first storage section;
a fourth registration control section that provides control to register the received e-mail address in said second storage section when said second determining section determines that the received e-mail address is not stored in said first storage section;
a second authenticating section that requests authentication information from the external apparatus to carry out an authenticating process on the received e-mail address when said second determining section determines that the received e-mail address is stored in said first storage section; and
a fifth registration control section that provides control to delete the received e-mail address from said first storage section and registers the e-mail address in said second storage section when said second authenticating section has succeeded in authentication of the received e-mail address, and to reject registration of the received e-mail address in said second storage section when said second authenticating section has failed in authentication of the received e-mail address.

2. An electronic mail distributing apparatus according to claim 1, further comprising:
a second confirmation e-mail sending section that sends a confirmation e-mail, containing authentication information for use in the authenticating process carried out by said second authenticating section, to the e-mail address registered in said first storage section by said first registration control section or said second registration control section.

3. An electronic mail distributing apparatus according to claim 1, further comprising:
a third receiving section that receives an instruction for deleting a desired e-mail address from e-mail addresses stored in said first storage section from at least one of the external apparatus;
a third determining section that determines whether the instruction received by said third receiving section includes an instruction for registering the e-mail address desired to be deleted as an e-mail address to which e-mail distribution is to be rejected in said second storage section; and
a sixth registration control section that provides control to delete the e-mail address from said first storage section and register the e-mail address in said second storage section when said third determining section determines that the instruction received by said third receiving section includes the instruction for registering the e-mail address in said second storage section, and to delete the e-mail address from said first storage section when said third determining section determines that the instruction received by said third receiving section does not include the instruction for registering the e-mail address in said second storage section.

4. An electronic mail distributing apparatus connected to at least one external apparatus via a network, comprising:
a first storage section that stores e-mail addresses as destinations of e-mails to be distributed;
a second storage section that stores e-mail addresses to which e-mail distribution is rejected;
a distributing section that distributes desired e-mails addressed to the e-mail addresses stored in said first storage section;
a first receiving section that receives an e-mail address as a destination of e-mails to be distributed from at least one of the external apparatus;
a first determining section that determines whether the e-mail address received by said first receiving section is stored in said second storage section;
a first registration control section that provides control to register the received e-mail address in said first storage section when said first determining section determines that the received e-mail address is not stored in said second storage section;
a second registration control section that provides control to reject registration of the received e-mail address in said first storage section when said first determining section determines that the received e-mail address is stored in said second storage section;
a second receiving section that receives an e-mail address, to which e-mail distribution is to be rejected, from at least one of the external apparatus;
a second determining section that determines whether the e-mail address received by said second receiving section is stored in said first storage section;
a fourth registration control section that provides control to register the received e-mail address in said second storage section when said second determining section determines that the received e-mail address is not stored in said first storage section;
a second authenticating section that requests authentication information from the external apparatus to carry out an authenticating process on the received e-mail address when said second determining section determines that the received e-mail address is stored in said first storage section; and
a fifth registration control section that provides control to delete the received e-mail address from said first storage section and registers the e-mail address in said second storage section when said second authenticating section has succeeded in authentication of the received e-mail address, and to reject registration of the received e-mail address in said second storage section when said second authenticating section has failed in authentication of the received e-mail address.

5. An electronic mail distributing apparatus connected to at least one external apparatus via a network, comprising:
a first storage section that stores e-mail addresses as destinations of e-mails to be distributed;
a second storage section that stores e-mail addresses to which e-mail distribution is rejected;
a distributing section that distributes desired e-mails addressed to the e-mail addresses stored in said first storage section;
a first receiving section that receives an e-mail address as a destination of e-mails to be distributed from at least one of the external apparatus;
a first determining section that determines whether the e-mail address received by said first receiving section is stored in said second storage section;
a first registration control section that provides control to register the received e-mail address in said first storage section when said first determining section determines that the received e-mail address is not stored in said second storage section;
a second registration control section that provides control to reject registration of the received e-mail address in said first storage section when said first determining section determines that the received e-mail address is stored in said second storage section;
a third receiving section that receives an instruction for deleting a desired e-mail address from the e-mail addresses stored in said first storage section from at least one of the external apparatus; and
a third determining section that determines whether the instruction received by said third receiving section includes an instruction for registering the e-mail address desired to be deleted as an e-mail address to which e-mail distribution is to be rejected in said second storage section; and
a sixth registration control section that provides control to delete the e-mail address from said first storage section and register the e-mail address in said second storage section when said third determining section determines that the instruction received by said third receiving section includes the instruction for registering the e-mail address in said second storage section, and to delete the e-mail address from said first storage section when said third determining section determines that the instruction received by said third receiving section does not include the instruction for registering the e-mail address in said second storage section.

6. An e-mail distributing method applied to a computer connected to at least one external apparatus via a network, the computer including a first storage section that stores e-mail addresses to which e-mails are distributed, and a second storage section that stores e-mail addresses to which e-mail distribution is rejected, the method comprising:

a first receiving step of receiving an e-mail address as a destination of e-mails to be distributed from at least one of the external apparatus;

a first determining step of determining whether the e-mail address received in said first receiving step is stored in the second storage section;

a first registration control step of providing control to register the received e-mail address in the first storage section when it is determined in said first determining step that the received e-mail address is not stored in the second storage section;

a first authenticating step of requesting authentication information from the external apparatus to carry out an authenticating process on the received e-mail address when it is determined in said first determining step that the received e-mail address is stored in the second storage section;

a second registration control step of providing control to register the received e-mail address in the first storage section when the authenticating process has been successfully carried out in said first authenticating step, and to reject registration of the received e-mail address in the first storage section when the authenticating process has been unsuccessfully carried out in said first authenticating step;

a second receiving step of receiving an e-mail address, to which e-mail distribution is to be rejected, from at least one of the external apparatus;

a second determining step of determining whether the e-mail address received in said second receiving step is stored in the first storage section;

a fourth registration control step of providing control to register the received e-mail address in the second storage section when it is determined in said second determining step that the received e-mail address is not stored in the first storage section;

a second authenticating step of requesting authentication information from the external apparatus to carry out an authenticating process on the received e-mail address when it is determined in said second determining step that the received e-mail address is stored in the first storage section; and a fifth registration control step of providing control to delete the received e-mail address from the first storage section and register the e-mail address in the second storage section when the authenticating process has been successfully carried out in said second authenticating step, and to reject registration of the received e-mail address in the second storage section when the authenticating process has been unsuccessfully carried out in said second authenticating step.

7. An e-mail distributing method according to claim 6, further comprising:

a second confirmation e-mail sending step of sending a confirmation e-mail, containing authentication information for use in the authenticating process carried out in said second authenticating step, to the e-mail address registered in the first storage section in said first registration control step or said second registration control step.

8. An e-mail distributing method according to claim 6, further comprising:

a third receiving step of receiving an instruction for deleting a desired e-mail address from e-mail addresses stored in the first storage section from at least one of the external apparatus;

a third determining step of determining whether the instruction received in said third receiving step includes an instruction for registering the e-mail address desired to be deleted as an e-mail address to which e-mail distribution is to be rejected in the second storage section; and a sixth registration control step of providing control to delete the e-mail address from the first storage section and register the e-mail address in the second storage section when it is determined in said third determining step that the instruction received in said third receiving step includes the instruction for registering the e-mail address in the second storage section, and to delete the e-mail address from the first storage section when it is determined in said third determining section step that the instruction received in said third receiving step does not include the instruction for registering the e-mail address in the second storage section.

9. An e-mail distributing method applied to a computer connected to at least one external apparatus via a network, the computer including a first storage section that stores e-mail addresses as destinations of e-mails to be distributed, and a second storage section that stores e-mail addresses to which e-mail distribution is rejected, the e-mail distributing method comprising:

a first receiving step of receiving an e-mail address as a destination of e-mails to be distributed from at least one of the external apparatus;

a first determining step of determining whether the e-mail address received in said first receiving step is stored in the second storage section;

a first registration control step of providing control to register the received e-mail address in the first storage section when it is determined in said first determining step that the received e-mail address is not stored in the second storage section;

a second registration control step of providing control to reject registration of the received e-mail address in the first storage section when it is determined in said first determining step that the received e-mail address is stored in the second storage section;

a second receiving step of receiving an e-mail address, to which e-mail distribution is to be rejected, from at least one of the external apparatus;

a second determining step of determining whether the e-mail address received in said second receiving step is stored in the first storage section;

a fourth registration control step of providing control to register the received e-mail address in the second storage section when it is determined in said second determining step that the received e-mail address is not stored in the first storage section;

a second authenticating step of requesting authentication information from the external apparatus to carry out an authenticating process on the received e-mail address when it is determined in said second determining step that the received e-mail address is stored in the first storage section; and a fifth registration control step of providing control to delete the received e-mail address from the first storage section and register the e-mail address in the second storage section when the authenticating process has been successfully carried out in said second authenticating step, and to reject registration of the received e-mail address when the authenticating process has been unsuccessfully carried out in said second authenticating step.

10. An e-mail distributing method applied to a computer connected to at least one external apparatus via a network, the computer including a first storage section that stores e-mail addresses as destinations of e-mails to be distributed, and a second storage section that stores e-mail addresses to which e-mail distribution is rejected, the e-mail distributing method comprising:

- a first receiving step of receiving an e-mail address as a destination of e-mails to be distributed from at least one of the external apparatus;
- a first determining step of determining whether the e-mail address received in said first receiving step is stored in the second storage section;
- a first registration control step of providing control to register the received e-mail address in the first storage section when it is determined in said first determining step that the received e-mail address is not stored in the second storage section;
- a second registration control step of providing control to reject registration of the received e-mail address in the first storage section when it is determined in said first determining step that the received e-mail address is stored in the second storage section;
- a third receiving step of receiving an instruction for deleting a desired e-mail address from the e-mail addresses stored in the first storage section from at least one of the external apparatus; and
- a third determining step of determining whether the instruction received in said third receiving step includes an instruction for registering the e-mail address desired to be deleted as an e-mail address to which e-mail distribution is to be rejected in the second storage section; and
- a sixth registration control step of providing control to delete the e-mail address from the first storage section and register the e-mail address in the second storage section when it is determined in said third determining step that the instruction received in said third receiving step includes the instruction for registering the e-mail address in the second storage section, and to delete the e-mail address from the first storage section when it is determined in said third determining step that the instruction received in said third receiving step does not include the instruction for registering the e-mail address in the second storage section.

11. A storage medium storing a control program executable by a computer for controlling an electronic mail distributing apparatus connected to at least one external apparatus via a network, the electronic mail distributing apparatus including the computer including a first storage section that stores e-mail addresses to which e-mails are distributed, and a second storage section that stores e-mail addresses to which e-mail distribution is rejected, the control program including a program code for causing the electronic mail distributing apparatus to execute the following steps:

- a first receiving step of receiving an e-mail address as a destination of e-mails to be distributed from at least one of the external apparatus;
- a first determining step of determining whether the e-mail address received in said first receiving step is stored in the second storage section;
- a first registration control step of providing control to register the received e-mail address in the first storage section when it is determined in said first determining step that the received e-mail address is not stored in the second storage section;
- a first authenticating step of requesting authentication information from the external apparatus to carry out an authenticating process on the received e-mail address when it is determined in said first determining step that the received e-mail address is stored in the second storage section;
- a second registration control step of providing control to register the received e-mail address in the first storage section when the authenticating process has been successfully carried out in said first authenticating step, and to reject registration of the received e-mail address in the first storage section when the authenticating process has been unsuccessfully carried out in said first authenticating step;
- a second receiving step of receiving an e-mail address, to which e-mail distribution is to be rejected, from at least one of the external apparatus;
- a second determining step of determining whether the e-mail address received in said second receiving step is stored in the first storage section;
- a fourth registration control step of providing control to register the received e-mail address in the second storage section when it is determined in said second determining step that the received e-mail address is not stored in the first storage section;
- a second authenticating step of requesting authentication information from the external apparatus to carry out an authenticating process on the received e-mail address when it is determined in said second determining step that the received e-mail address is stored in the first storage section; and
- a fifth registration control step of providing control to delete the received e-mail address from the first storage section and register the e-mail address in said second storage section when the authenticating process has been successfully carried out in said second authenticating step, and to reject registration of the received e-mail address in the second storage section when the authenticating process has been unsuccessfully carried out in said second authenticating step.

12. A storage medium according to claim 11, further including a program code for causing the electronic mail distributing apparatus to execute the following steps:

- a second confirmation e-mail sending step of sending a confirmation e-mail, containing authentication information for use in the authenticating process carried out in said second authenticating step, to the e-mail address registered in the first storage section in said first registration control step or said second registration control step.

13. A storage medium according to claim 11, further including a program code for causing the electronic mail distributing apparatus to execute the following steps:

- a third receiving step of receiving an instruction for deleting a desired e-mail address from e-mail addresses stored in the first storage section from at least one of the external apparatus;
- a third determining step of determining whether the instruction received in said third receiving step includes an instruction for registering the e-mail address desired to be deleted as an e-mail address to which e-mail distribution is to be rejected in the second storage section; and
- a sixth registration control step of providing control to delete the e-mail address from the first storage section and register the e-mail address in the second storage section when it is determined in said third determining step that the instruction received in said third receiving step includes the instruction for registering the e-mail address in the second storage section, and to delete the e-mail address from the first storage section when it is determined in said third determining section step that the instruction received in said third receiving step does not include the instruction for registering the e-mail address in the second storage section.

14. A storage medium storing a control program executable by a computer for controlling an electronic mail distributing apparatus connected to at least one external apparatus via a network, the electronic mail distributing apparatus including a first storage section that stores e-mail addresses as destinations of e-mails to be distributed, and a second storage section that stores e-mail addresses to which e-mail distribution is rejected, the control program including a program code for causing the electronic mail distributing apparatus to execute the following steps:

a first receiving step of receiving an e-mail address as a destination of e-mails to be distributed from at least one of the external apparatus;

a first determining step of determining whether the e-mail address received in said first receiving step is stored in the second storage section;

a first registration control step of providing control to register the received e-mail address in the first storage section when it is determined in said first determining step that the received e-mail address is not stored in the second storage section;

a second registration control step of providing control to reject registration of the received e-mail address in the first storage section when it is determined in said first determining step that the received e-mail address is stored in the second storage section;

a second receiving step of receiving an e-mail address, to which e-mail distribution is to be rejected, from at least one of the external apparatus;

a second determining step of determining whether the e-mail address received in said second receiving step is stored in the first storage section;

a fourth registration control step of providing control to register the received e-mail address in the second storage section when it is determined in said second determining step that the received e-mail address is not stored in the first storage section;

a second authenticating step of requesting authentication information from the external apparatus to carry out an authenticating process on the received e-mail address when it is determined in said second determining step that the received e-mail address is stored in the first storage section; and a fifth registration control step of providing control to delete the received e-mail address from the first storage section and register the e-mail address in the second storage section when the authenticating process has been successfully carried out in said second authenticating step, and to reject registration of the received e-mail address when the authenticating process has been unsuccessfully carried out in said second authenticating step.

15. A storage medium according to claim 14 further including a program code for causing the electronic mail distributing apparatus to execute the following steps:

a third receiving step of receiving an instruction for deleting a desired e-mail address from the e-mail addresses stored in the first storage section from at least one of the external apparatus; and a third determining step of determining whether the instruction received in said third receiving step includes an instruction for registering the e-mail address desired to be deleted as an e-mail address to which e-mail distribution is to be rejected in the second storage section; and a sixth registration control step of providing control to delete the e-mail address from the first storage section and register the e-mail address in the second storage section when it is determined in said third determining step that the instruction received in said third receiving step includes the instruction for registering the e-mail address in the second storage section, and to delete the e-mail address from the first storage section when it is determined in said third determining step that the instruction received in said third receiving step does not include the instruction for registering the e-mail address in the second storage section.

* * * * *